(12) United States Patent
Kanso et al.

(10) Patent No.: US 8,549,533 B2
(45) Date of Patent: Oct. 1, 2013

(54) RANKING SERVICE UNITS TO PROVIDE AND PROTECT HIGHLY AVAILABLE SERVICES USING N+M REDUNDANCY MODELS

(75) Inventors: Ali Kanso, Montreal (CA); Maria Toeroe, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 315 days.

(21) Appl. No.: 13/051,824

(22) Filed: Mar. 18, 2011

(65) Prior Publication Data

US 2012/0240129 A1 Sep. 20, 2012

(51) Int. Cl.
*G06F 9/46* (2006.01)
(52) U.S. Cl.
USPC ........................................................ 718/105
(58) Field of Classification Search
USPC ........................................................ 718/105
See application file for complete search history.

(56) References Cited

U.S. PATENT DOCUMENTS

| | | | | |
|---|---|---|---|---|
| 6,854,069 | B2 * | 2/2005 | Kampe et al. | 714/4.12 |
| 7,401,256 | B2 * | 7/2008 | Ishida | 714/21 |
| 2009/0037367 | A1 * | 2/2009 | Wein | 707/2 |
| 2009/0164832 | A1 | 6/2009 | Kanso et al. | |
| 2010/0169446 | A1 * | 7/2010 | Linden et al. | 709/206 |

FOREIGN PATENT DOCUMENTS

WO 2008/144898 A1 12/2008

OTHER PUBLICATIONS

Bassek et al, Redundancy Schemes for High Availability Computer Clusters, Journal of Computer Science 2(1), 2006, pp. 33-47.*
Huang et al, Lifetime Reliability for Load-sharing redundant systems with arbitray failure distributions, IEEE Transaction on Reliability, vol. 59, No. 2, Jun. 2010, pp. 319-330.*
Service Availability Forum, Application Interface Specification, Availability Management Framework SAI-AIS-AMF-B.04.01, Oct. 21, 2008, pp. 1-452.
Jong Kim et al., Process Allocation for Load Distribution in Fault-Tolerant Multicomputers, International Symposium on Fault Tolerant Computing, Los Alamitos, IEEE Comp.Soc. Press, US, vol. Symp. 25, Jun. 27, 1995, pp. 174-183.
EP Search Report from corresponding application 12158788.5.

* cited by examiner

*Primary Examiner* — Diem Cao
(74) *Attorney, Agent, or Firm* — Blakely, Sokoloff, Taylor & Zafman

(57) ABSTRACT

Among other things, embodiments described herein enable systems, e.g., Availability Management Forum (AMF) systems, having service units to operate with balanced loads both before and after the failure of one of the service units. A method for balancing standby workload assignments and active workload assignments for a group of service units in a system which employs an N+M redundancy model, wherein N service units are active service units and M service units are standby service units is described. An active workload that the N active service units need to handle is calculated and each of the N active service units in the group is provided with an active workload assignment based on the calculated active workload. Standby workload assignments are distributed among the M standby service units substantially equally.

24 Claims, 27 Drawing Sheets

600 ─↘

| 10 | 10 | 10 | Σ=30 |
|---|---|---|---|
| SU1 | SU2 | SU3 | Active |

| 15 | 15 | Σ=30 |
|---|---|---|
| SU4 | SU5 | Standby |

|  | SU1 | ... | SUj | ... | SUm | #Act |
|---|---|---|---|---|---|---|
| SU1 |  |  |  |  |  |  |
| ... |  |  |  |  |  |  |
| SUi |  |  |  |  |  |  |
| ... |  |  |  |  |  |  |
| SUn |  |  |  |  |  |  |
| #Stdb |  |  |  |  |  |  |

FIG. 7

|  | SU8 | SU9 | SU10 | SU11 | Active |
|---|---|---|---|---|---|
| SU1 | 4 |  |  |  | 4 |
| SU2 | 4 |  |  |  | 4 |
| SU3 | 3 |  |  |  | 3 |
| SU4 |  | 3 |  |  | 3 |
| SU5 |  |  | 3 |  | 3 |
| SU6 |  |  |  | 3 | 3 |
| SU7 |  |  |  | 3 | 3 |
| Standby | 11 | 3 | 3 | 6 | $\sum = 23$ |

```
1. isBalanced()
2. Begin
3.    if (each unlocked column has a sum of cell values equal to any other
4.    column ±1) then return true
5.    else
6.        return false
7.    endIf
8. end isBalanced()
9. solveOneActiveForOneStandbyCSP()
10. Begin
11.   While (not isBalanced(1)
12.       minStdbSUColumn ← the unlocked column with minimum sum of cell
13.       values
14.       maxStdbSUColumn ← the unlocked column with maximum sum of
15.       cell values
16.       if ([maxStdbSUColumn] - [minStdbSUColumn] > ceil (Active) then
17.           if (maxStdbSUColumn has a ceil (Active) in its cells) then
18.               SHIFT a ceil (Active) value from maxStdbSUColumn to
19.               minStdbSUColumn
```

FIG. 10

```
20.            else
21.                SHIFT a floor (Active) value from maxStdbSUColumn to
22.                minStdbSUColumn
23.            endIf
24.        elseIf (1 <[maxStdbSUColumn] - [minStdbSUColumn] ≤ ceil (Active))
25.        then
26.            if (maxStdbSUColumn has a ceil (Active) in its cells AND
27.            minStdbSUColumn has a floor (Active) in its cells) then
28.                SWAP a ceil (Active) value from maxStdbSUColumn with a
29.                floor (Active) value from minStdbSUColumn
30.            elseIf (maxStdbSUColumn has NO ceil (Active) in its cells
31.            then
32.                LOCK maxStdbSUColumn
33.            else//minStdbSUColumn has NO floor (Active) in its cells
34.                LOCK minStdbSUColumn
35.            endIf
36.        endIf
37.    endWhile
38. end solveOneActiveForOneStandbyCSP ( )
```

FIG. 10 CONTINUE

Table 900:

| | SU8 | SU9 | SU10 | SU11 | Active |
|---|---|---|---|---|---|
| SU1 | 4 | | | | 4 |
| SU2 | 4 | | | | 4 |
| SU3 | 3 | | | | 3 |
| SU4 | | 3 | | | 3 |
| SU5 | | | 3 | | 3 |
| SU6 | | | | 3 | 3 |
| SU7 | | | | 3 | 3 |
| Standby | 11 | 3 | 3 | 6 | $\Sigma = 23$ |

Table 1100:

| | SU8 | SU9 | SU10 | SU11 | Active |
|---|---|---|---|---|---|
| SU1 | 4 | | | | 4 |
| SU2 | | | 4 | | 4 |
| SU3 | 3 | | | | 3 |
| SU4 | | 3 | | | 3 |
| SU5 | | 3 | | | 3 |
| SU6 | | | | 3 | 3 |
| SU7 | | | | 3 | 3 |
| Standby | 7 | 6 | 4 | 6 | $\Sigma = 23$ |

| | SU8 | SU9 | SU10 | SU11 | Backup standby |
|---|---|---|---|---|---|
| SU8 | N/A | +3 | +3 | +3 | |
| SU9 | +2 | N/A | +2 | +2 | |
| SU10 | +0 | +0 | N/A | +0 | |
| SU11 | +2 | +2 | +2 | N/A | |
| Standby | 7 | 6 | 4 | 6 | $\sum = 23$ — *1300* |

Sub steps 1 & 2

Sub step 3

| | SU8 | SU9 | SU10 | SU11 | Backup standby |
|---|---|---|---|---|---|
| SU8 | N/A | 1 +3 | 1 +3 | 1 +3 | 3 |
| SU9 | 2 +2 | N/A | 2 +2 | 2 +2 | 6 |
| SU10 | 4 +0 | 4 +0 | N/A | 3 +0 | 11 |
| SU11 | 1 +2 | 1 +2 | 1 +2 | N/A | 3 |
| Standby | 7 | 6 | 4 | 6 | $\sum = 23$ |

| | SU8 | SU9 | SU10 | SU11 | Backup standby |
|---|---|---|---|---|---|
| SU8 | N/A | +3 | +3 | +3 | |
| SU9 | +2 | N/A | +2 | +2 | |
| SU10 | +0 | +0 | N/A | +0 | |
| SU11 | +2 | +2 | +2 | N/A | |
| Standby | 7 | 6 | 4 | 6 | $\Sigma = 23$ |

Sub steps 1 & 2

Sub step 3

| | SU8 | SU9 | SU10 | SU11 | Backup standby |
|---|---|---|---|---|---|
| SU8 | N/A | +3 | +3 | +3 | 3 |
| SU9 | +2 | N/A | 4 +2 | +2 | 6 |
| SU10 | 7 +0 | 6 +0 | N/A | 6 +0 | 11 |
| SU11 | +2 | +2 | +2 | N/A | 3 |
| Standby | 7 | 6 | 4 | 6 | $\Sigma = 23$ |

| SI\SU | SU1 | SU2 | SU3 | SU4 | SU5 | SU6 | SU7 | SU8 | SU9 | SU10 | SU11 |
|---|---|---|---|---|---|---|---|---|---|---|---|
| SI1 | 1 | | | | | | | | 2 | | 3 |
| SI2 | 1 | | | | | | | | 2 | | 3 |
| SI3 | 1 | | | | | | | | 2 | | 3 |
| SI4 | 1 | | | | | | | | 2 | | 3 |
| SI5 | | | 1 | | | | | | 2 | | 3 |
| SI6 | | | 1 | | | | | | 2 | | 3 |
| SI7 | | | 1 | | | | | | 2 | | 3 |
| SI8 | | | | 1 | | | | | | 2 | 3 |
| SI9 | | | | 1 | | | | | | 2 | 3 |
| SI10 | | | | 1 | | | | | | 2 | 3 |
| SI11 | | | | | 1 | | | | | 2 | 3 |
| SI12 | | | | | 1 | | | | | 2 | 3 |
| SI13 | | | | | 1 | | | | | 2 | 3 |
| SI14 | | 1 | | | | | | | | 3 | 2 |
| SI15 | | 1 | | | | | | | | 3 | 2 |
| SI16 | | 1 | | | | | | | | 3 | 2 |
| SI17 | | 1 | | | | | | | | 3 | 2 |
| SI18 | | | | | | 1 | | | | 3 | 2 |
| SI19 | | | | | | 1 | | | | 3 | 2 |
| SI20 | | | | | | 1 | | | | 3 | 2 |
| SI21 | | | | | | | 1 | | | 3 | 2 |
| SI22 | | | | | | | 1 | | | 3 | 2 |
| SI23 | | | | | | | 1 | | | 3 | 2 |

FIG. 17

```
1. isBalanced()
2. Begin
3.    if (each column has a sum of cell values equal to the one specified in
4.    the cell of desired standby of this column then return true
5.    else
6.        return false
7.    endIf
8. end isBalanced()
9. solveSplittingCSP()
10. Begin
11.    While (not isBalanced())
12.        minStdbSUColumn ← the column with minimum sum of cell values
13.        maxStdbSUColumn ← the column with maximum sum of cell values
14.        SPLIT from one unlocked cell of maxStdbSUColumn a value of:
15.        ([maxStdbSUColumn] - desired standby value of maxStdbSUColumn)
16.        and give it to the cell of the same row in the minStdbSUColumn.
17.        LOCK both modified cells in both columns.
18.    endWhile
19. end solveSplittingSCP()
```

Fig. 19

| Approach\Features | Active load balancing before failure | Standby load balancing before failure | Active load balancing after failure | Standby load balancing after failure | Not violating pref. number of active SUs | Not loosing more that one standby SU | Even re-distribution of the standby load after failure | Suitable to be used when the autoadjust off |
|---|---|---|---|---|---|---|---|---|
| The one active for one standby | ✓ | ⊘ | ✓ | ⚠ | ✓ | ✓ | ✓ | ✓ |
| The one active for one standby for one backup-standby | ✓ | ⊘ | ✓ | ⊘ | ✓ | ✓ | ⊘ | ✓ |
| The complete balance before failure | ✓ | ✓ | ⊘ | ✓ | ⊘ | ⊘ | ✓ | ⊘ |

FIG-25

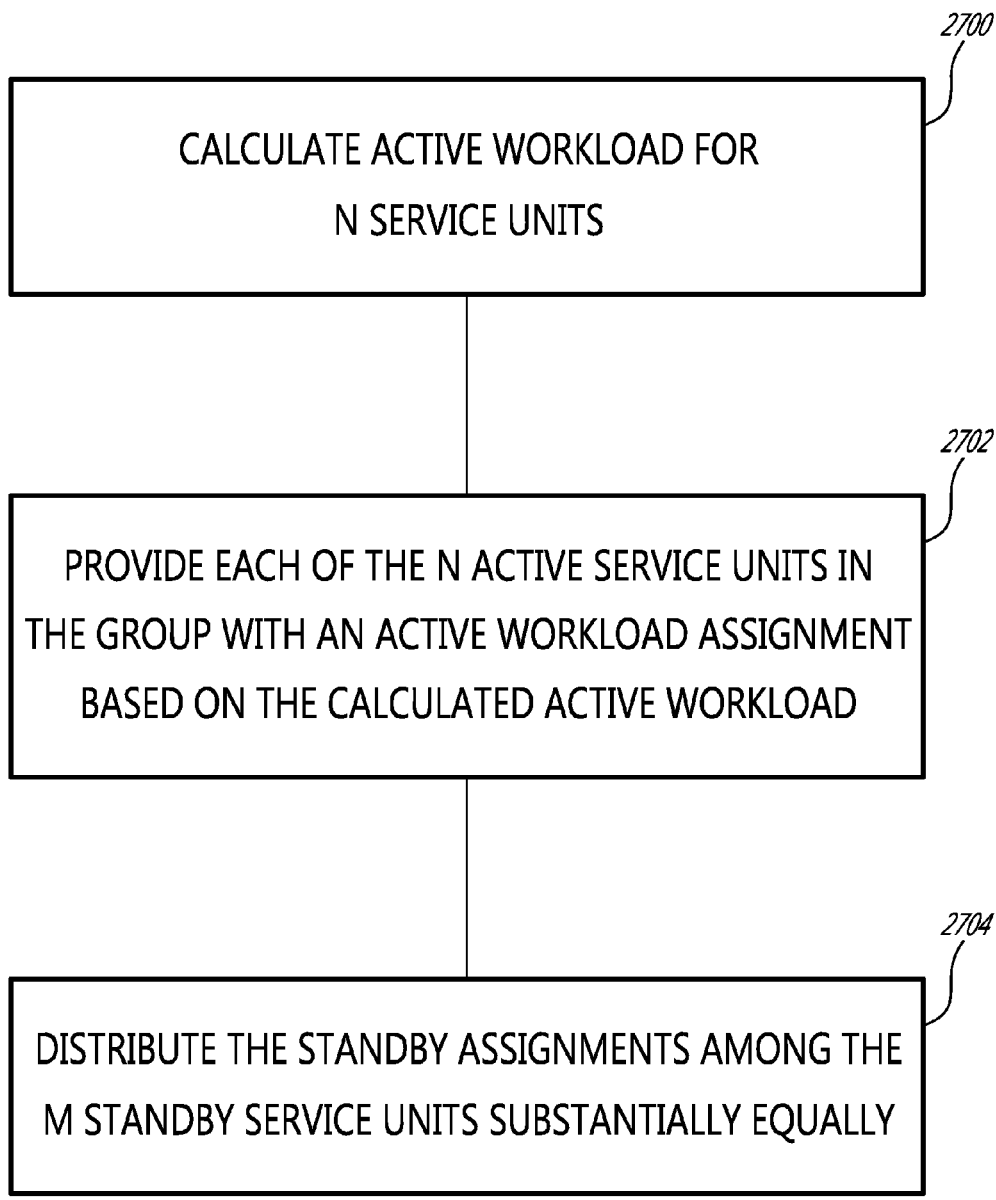

RANKING SERVICE UNITS TO PROVIDE AND PROTECT HIGHLY AVAILABLE SERVICES USING N+M REDUNDANCY MODELS

TECHNICAL FIELD

The present invention generally relates to high availability systems (hardware and software) and, more particularly, to managing workload assignments and backup assignments associated with such high availability (or other) systems.

BACKGROUND

High availability systems (also known as HA systems) are systems that are implemented primarily for the purpose of improving the availability of services which the systems provide. Availability can be expressed as a percentage of time during which a system or service is "up". For example, a system designed for 99.999% availability (so called "five nines" availability) refers to a system or service which has a downtime of only about 0.44 minutes/month or 5.26 minutes/year.

High availability systems provide for a designed level of availability by employing redundant nodes, which are used to provide service when system components fail. For example, if a server running a particular application crashes, an HA system will detect the crash and restart the application on another, redundant node. Various redundancy models can be used in HA systems. As HA systems become more commonplace for the support of important services such file sharing, internet customer portals, databases and the like, it has become desirable to provide standardized models and methodologies for the design of such systems. The reader interested in more information relating to the AIS standard specification is referred to Application Interface Specifications (AIS), Release 6.1, which is available at the Service Availability (SA) Forum website.

Of particular interest for the present application is the Availability Management Framework (AMF), which is a software entity or service defined within the AIS specification. According to the AIS specification, the AMF is a standardized mechanism for providing service availability by coordinating redundant resources within a cluster to deliver a system with no single point of failure.

The AMF service requires a configuration for any application it manages. An AMF configuration can be seen as an organization of some logical entities. It also comprises information that can guide AMF in assigning the workload to the application components. AMF managed applications are typically deployed as distributed system over a cluster of nodes, and load balancing is therefore an important aspect to be considered when designing the configuration.

Designing an AMF configuration requires a good understanding of AMF entities, their relations, and their grouping. This grouping is guided by the characteristics of the software that will be deployed in an AMF managed cluster. These characteristics are described by the software vendor in terms of prototypes delivered in an Entity Types File (ETF).

More specifically, the design of an AMF configuration consists of selecting a set of AMF entity types from a set of ETF prototypes, specifying the entities and their attributes in order to provide and protect the services as required by the configuration designer. Creating manually such a configuration can be a tedious and error prone task due to the large number of required types, entities and attributes. This is combined with the complexity of selecting the appropriate ETF prototypes and deriving from them the necessary AMF types to be used in the configuration. During the type selection and derivation, several constraints need to be satisfied. Some of these constraints require calculations and extensive consistency checks. Moreover, the configuration ideally needs to be designed in such a way that load balancing is preserved even in case of failure.

In terms of the AMF entities, in an AMF configuration a component represents a set of hardware and/or software resources that implements the APIs that allow AMF to control its life cycle and its workload assignment. The components that combine their functionalities to provide a more integrated service are logically grouped into a service unit (SU). For control purposes, the workload assigned to a component is abstracted as a component service instance (CSI). CSIs are grouped into a service instance (SI), which represent an abstraction of workload assigned to the SU. In order to ensure the provision of the SI in case of an SU failure, SUs are grouped into a service group (SG). The SGs are grouped into an application. An SU can be assigned the active HA (High Availability) state for an SI, the standby HA state, or it can be a spare one. The SI is provided by the SU(s) assigned the HA active state. The SIs provisioning is protected by the SG according to a redundancy model. AMF will dynamically shift the assignment of the SI from a failed SU to another SU in the same SG. There are two additional AMF logical entities used for deployment purpose: the cluster and the node. The cluster consists of a collection of nodes under the control of AMF.

An example of an AMF configuration 100 is shown in FIG. 1 where the components C1 and C2 are grouped into SU1, which collaborates with other similar SUs of the SG 104 to protect the provision of the SIs, i.e., SU2 and SU3. An AMF application 102 is a grouping of SGs and the SIs that they protect. In this example each SI has one active assignment (represented by a solid arrow) and one standby assignment (represent by a dashed arrow). The SG redundancy model used in the example of FIG. 1 is called the Nway redundancy model.

As mentioned above, the assignment of SIs to SUs is performed at runtime. For the NWay redundancy model, this assignment, and the re-assignment after an SU failure, is performed for each SI according to its ranked list of SUs. The ranking is established at configuration time and reflects the preference in the assignment distribution. For example, this preference may be related to distribution of data in a distributed database. Using conventional algorithms to determine the ranked list, like round robin, the shifting of SIs from a failed SU to healthy ones may lead to an unbalanced workload among the SUs, which may lead to overload causing subsequent failures and performance degradation.

Accordingly, it would be desirable to provide methods, devices, systems and software for load and backup assignment management in, for example, high availability systems.

SUMMARY

Among other things, embodiments described herein enable systems having service units to operate with balanced loads both before and after the failure of one of the service units. A configuration can be generated which provides for distributed standby roles, backup standby roles and balanced active loads.

According to one exemplary embodiment, a method for balancing standby workload assignments and active workload assignments for a group of service units in a system which employs an N+M redundancy model, wherein N service units are active service units and M service units are standby service units includes calculating an active workload that the N active service units need to handle, providing each of the N active service units in the group with an active workload assignment based on the calculated active workload, and distributing standby workload assignments among the M standby service units substantially equally.

According to another embodiment, a configuration generator includes a processor configured to balance standby workload assignments and active workload assignments for a group of service units in a system which employs an N+M redundancy model, wherein N service units are active service units and M service units are standby service units by calculating an active workload that the N active service units need to handle, providing each of the N active service units in the group with an active workload assignment based on the calculated active workload, and distributing standby workload assignments among the M standby service units substantially equally.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 illustrates balanced active and standby assignments;

FIG. 7 depicts an assignment table;

FIG. 10 shows exemplary program code for per service unit standby load according to an embodiment;

FIG. 11 shows a balanced standby assignment table according to an embodiment;

FIG. 13 (a) shows a partially populated backup standby assignment table according to an embodiment;

FIG. 13 (b) shows a populated backup standby assignment table according to an embodiment;

FIGS. 16(a) and 16(b) depict populating a balanced backup standby assignment table according to another exemplary embodiment;

FIG. 17 shows a ranked list of service units according to another embodiment;

FIG. 19 is program code for balancing the per service instance standby load according to an embodiment;

FIG. 25 is a table showing various features associated with various embodiments;

FIG. 27 is a flowchart illustrating a method for balancing loads according to an embodiment.

DETAILED DESCRIPTION

Figure 1:
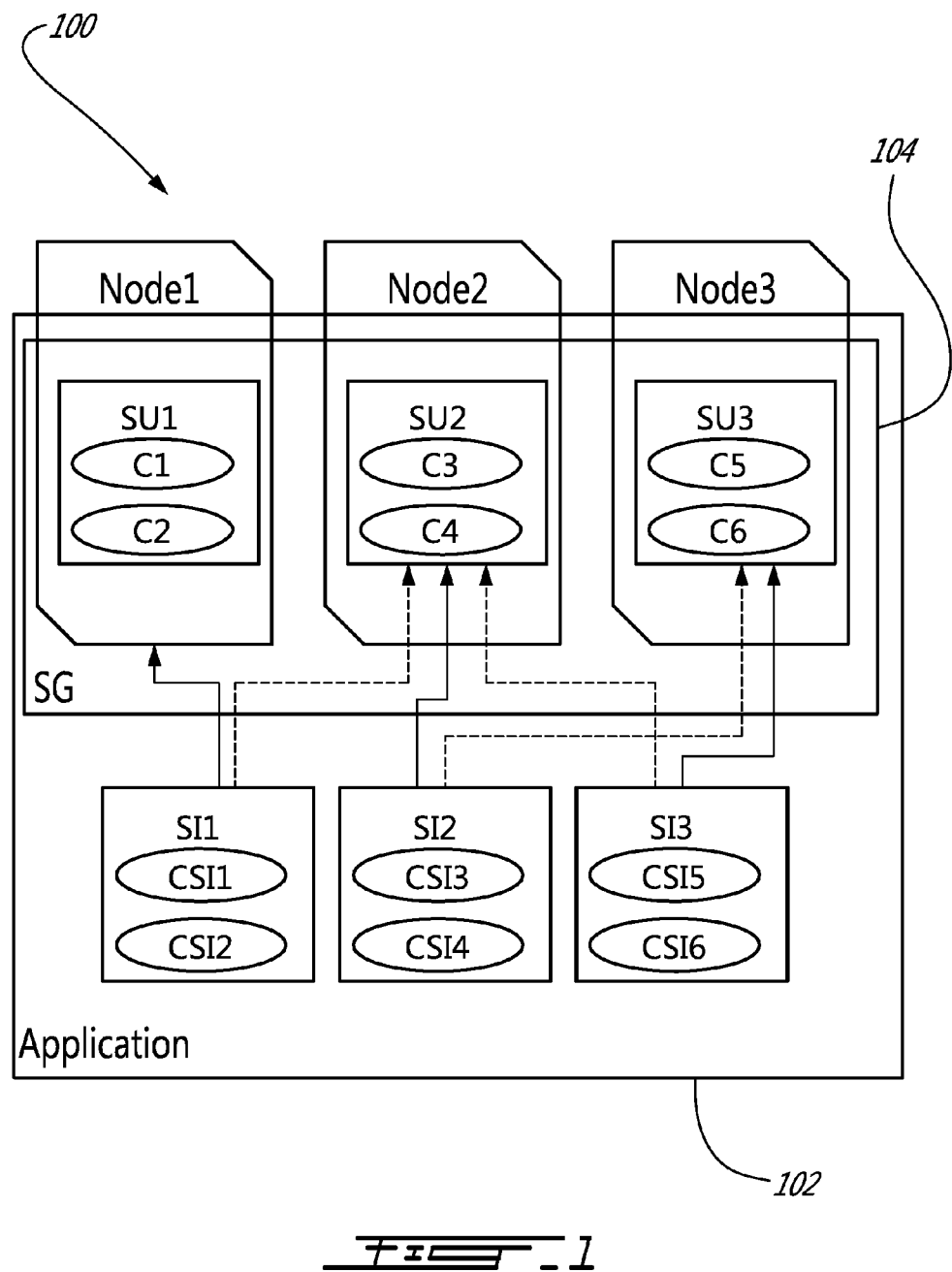
FIG. 1 illustrates an exemplary AMF configuration.

The following description of the exemplary embodiments of the present invention refers to the accompanying drawings. The same reference numbers in different drawings identify the same or similar elements. The following detailed description does not limit the invention. Instead, the scope of the invention is defined by the appended claims.

According to an embodiment, to ensure a continuous load balancing of service units in a system both prior to any service unit failure and in the presence of a failure, embodiments described herein views the workload assignment task as a Constraints Solving Problem (CSP) to generate various algorithms which can be used to perform workload assignments. Such algorithms can, at least in part, be based upon the type of redundancy model used in a system. In particular, embodiments described below focus on the N+M redundancy models.

In order to provide some context for methods and systems for balancing backup assignments and active workload assignments according to embodiments, a detailed discussion of AMF configuration generation will first be provided, since such embodiments can be implemented as part of an AMF configuration generation process. The detailed discussion associated with balancing backup assignments and active workload assignments begins at the heading "*Service Unit Ranking for Service Instances Amidst Load Balancing Concerns for N+M Redundancy Models*" below. Moreover, the presence of the following, detailed discussion of AMF configuration generation is intended to be purely illustrative rather than limiting, e.g., embodiments can be implemented in non-AMF systems.

As mentioned briefly above, an SG redundancy model defines how the SUs of the SG will protect the SIs of the SG. There are five different redundancy models, i.e., No-Redundancy, NWay, NWayActive, 2N and N+M, which are currently being used in conjunction with AMF systems. These redundancy models differ with respect to the distribution of the active and standby state assignments for the SI among the SUs, and define how many active and standby state assignments an SI may have. For example, the No-Redundancy redundancy model is typically used with non-critical components, when the failure of a component does not cause any severe impact on the overall system. In SGs using the No-Redundancy model, there are no standby SUs, but there can be spare SUs. An SI can be assigned to only one SU at a time. An SU is assigned the active HA state for at most one SI. Therefore, load balancing is not an issue for this redundancy model.

An SG with the NWay redundancy model contains N SUs that protect multiple SIs. An SU can simultaneously be assigned the active HA state for some SIs and the standby HA state for some other SIs. At most, one SU may have the active HA state for an SI, but one, or multiple SUs may have the standby HA state for the same SI.

An SG with the NWayActive redundancy model (also sometimes referred to as active-active or load-sharing) contains N SUs. An SU has to be active for all SIs assigned to it. An SU is never assigned the standby HA state for any SI. From the service side, for each SI, one, or multiple SUs can be assigned the active HA state according to the preferred number of assignments, numberOfActiveAssignments, configured for the SI. The numberOfActiveAssignments is always less or equal to the number of SUs in the SG. Techniques for balancing backup assignments and active workload assignments for a group of service units in a system which uses NWayActive redundancy model are described, for example, in U.S. patent application Ser. No. 13/020,550 filed on Feb. 3, 2011, the disclosure of which is incorporated here by reference.

The 2N redundancy model specifies that each SI protected by an SG can have one active and one standby HA state assignment and in the SG at most one SU will have the active HA state for all SIs of the SG and is referred to as the active SU, and at most one SU will have the standby HA state and is called the standby SU. In an AMF system using 2N redundancy there is one active SU at all time and, therefore, no load balancing is needed. The same is true for the standby SU.

An SG with the N+M redundancy model is similar to 2N, each SI has one active and one standby HA state assignments, but the SG has N active SUs and M standby SUs. An SU can be active for all SIs assigned to it or standby for all SIs assigned to it. That is to say, no SU can be simultaneously active for some SIs and standby for some other SIs. Load balancing may be needed for systems employing an N+M redundancy model, however the AMF specification does not currently specify any load balancing mechanism for this redundancy model.

Figure 2:
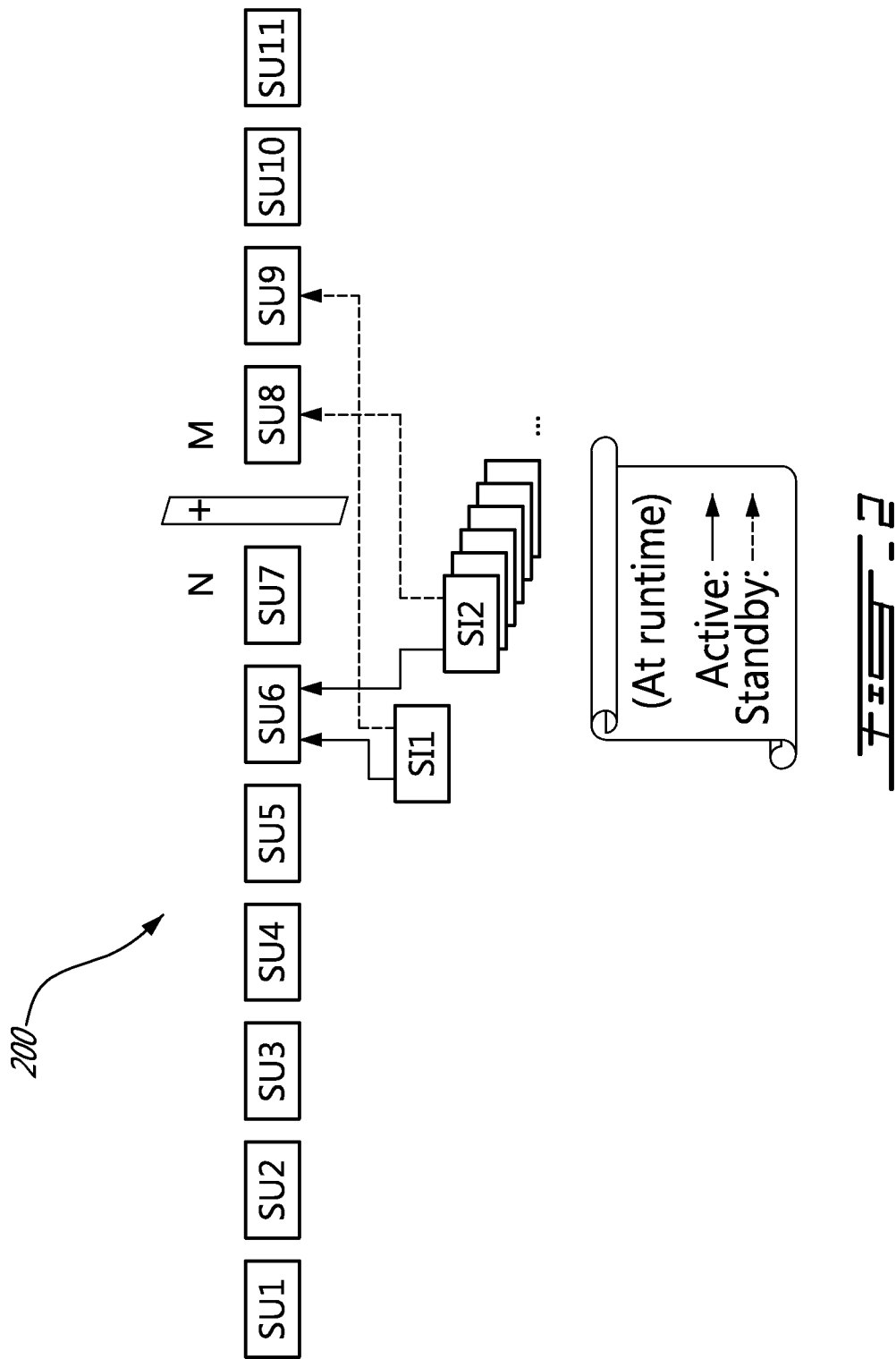
FIG. 2 describes an N+M redundancy model.

FIG. 2 illustrates an example of the N+M redundancy model 200, having 7 active SUs, SU1-SU7, and 4 standbys, SU8-SU11. The SUs are protecting a set of SIs. At runtime, AMF will assign the HA active state of each SIs to an active SU, and the HA standby state to a standby SU (in FIG. 2 only two of those assignments are illustrated to simplify the figure). The standby SUs will handle more assignments than the active SUs since there are fewer of them.

While the embodiments described below focus on the NWay and N+M redundancy models, and the assignment of SIs to SUs governed by the SUs ranking for the SIs based on such models, this should not, however, be construed as limiting to the scope of the present invention, as various aspects of these embodiments may be applicable to other redundancy models. Prior to discussing such embodiments, some additional information about AMF configurations and entity types will be provided for context.

All AMF entities, except the cluster and nodes, are typed. The entity types provide AMF with the information about the shared characteristics of their entities. For example, the component type determines the component service types any component of this type shall provide. AMF uses this information to determine to which component within an SU to assign a particular CSI. Therefore, when building an AMF configuration, the AMF types need to be determined before creating the AMF entities of these types. Table 1 below lists the AMF configuration entities and their corresponding types.

TABLE 1

The AMF configuration elements.

| Entity | Acronym | Brief description | Corresponding type |
|---|---|---|---|
| Component | — | A set of hardware and/or software resources | Component type |
| Service Unit | SU | A set of collaborating components | SU type |
| Service Group | SG | A set of SUs protecting a set of SIs | SG type |
| Application | — | A set of SGs and the SIs they protect | Application type |
| Service Instance | SI | The workload assigned to the SU | Service type |
| Component service Instance | CSI | The workload assigned to the component | CS type |
| Node | — | A cluster node | — |
| Cluster | — | The cluster hosting AMF and the applications | — |

AMF types are derived from prototypes defined in the Entity Types File (ETF), which is an XML file provided by the software vendor and that describes the application software developed to be managed by an AMF implementation. ETF prototypes, their relations, and main characteristics can be summarized as follows.

Component Type: A component type describes a particular version of a software implementation designed to be managed by AMF. The component type specifies the component service types that the components of this type can provide. It defines for each component service type the component capability model and any required dependency on other component service types. The component capability model is defined as triplet (x, y, b), where x represents the maximum number of active CSI assignments, y the maximum number of standby CSI assignments a component can handle for a particular component service type and b indicates whether active and standby assignments can be handled simultaneously.

Component Service Type (CS type): It describes the set of attributes that characterizes the workload that can be assigned to a component of a particular type in conjunction of providing some service.

Service Unit Type (SU type): The service unit type specifies the service types an SU of the type can provide, and the set of component types from which an SU of the type can be built. It may limit the maximum number of components of a particular type that can be included. Thus, the SU type defines any limitation on the collaboration and coexistence of component types within its SUs.

Service Type: A service type defines the set of component service types from which its SIs can be built. The service type may limit the number of CSIs of a particular CS type that can exist in a service instance of the service type. It is also used to describe the type of services supported by an SU type.

Service Group Type (SG type): The service group type defines for its SGs the redundancy model. It also specifies the different SU types permitted for its SGs. Thus the SG type plays a key role in determining the availability of services.

Application Type: The application type defines the set of SG types that may be used to build applications of this type.

It should be noted that the only mandatory types in an ETF are the component type and the component service type. Further types (i.e., SU types, SG types, service types and application types) may be used by the vendor to specify software implementation constraints and limitations to be considered at the integration of this software with an AMF implementation, but they are not mandatory. If no optional type is provided at a particular level (e.g. there is no SU type), then types of the level below (i.e. the component types) can be combined as needed without any restriction. If any optional type is provided at a particular level, it is assumed that all allowed types at that level are specified by the vendor.

Figure 3:
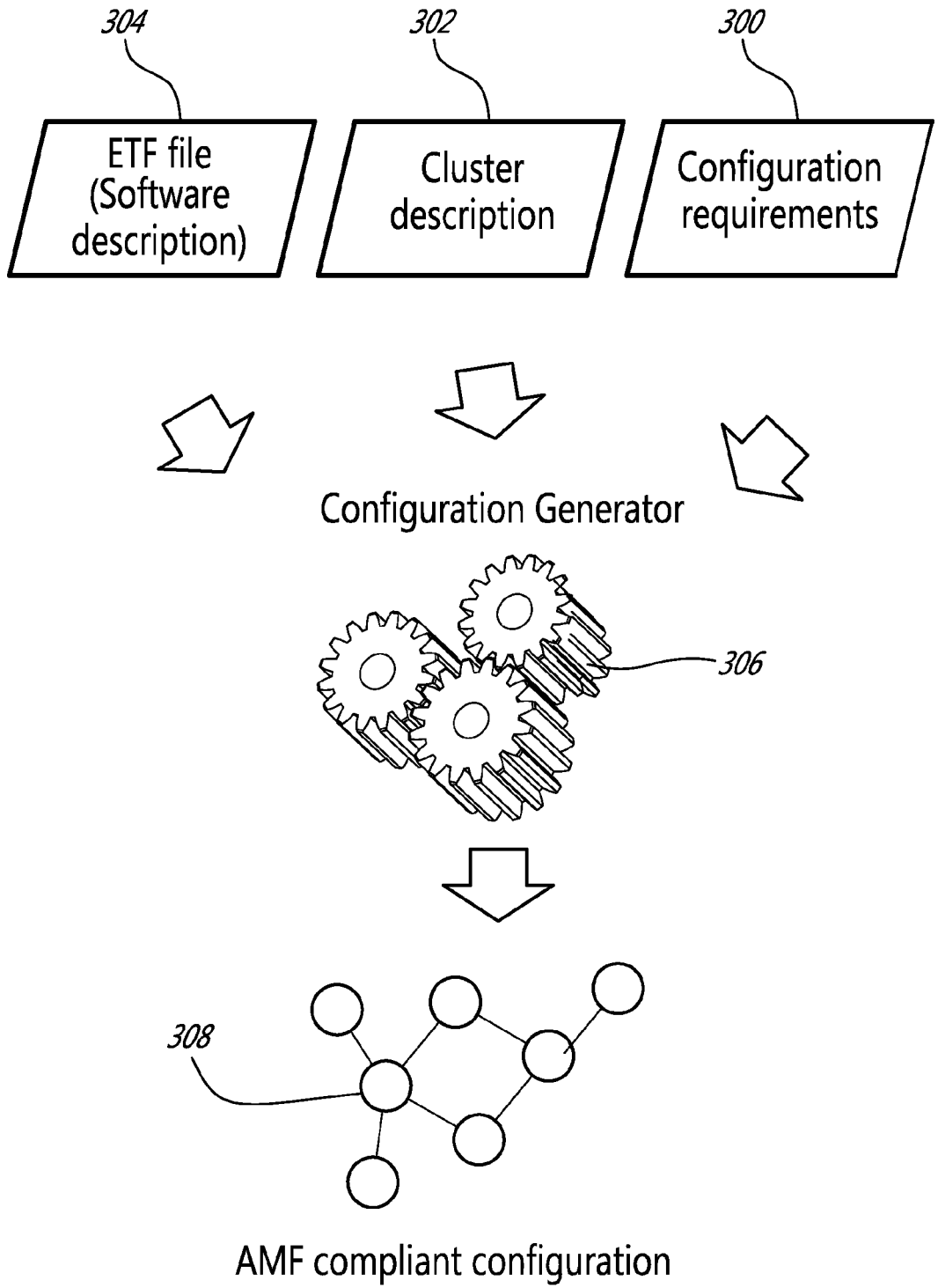
FIG. 3 depicts operation of an AMF configuration generator.

To generate an AMF configuration, an AMF configuration generator or method can take inputs from, for example, two sources: the configuration designer and the software vendor as is conceptually illustrated in FIG. 3. Therein, the configuration designer defines the services to be provided in terms of SIs and CSIs together with their desired protection, i.e., the redundancy model. This aspect is represented in FIG. 3 by the configuration requirements 300. The configuration designer also provides the information about the deployment cluster and its nodes, e.g., the number of nodes. The AMF cluster entity and the node entities, referred to in FIG. 3 as the cluster description 302, can be added to the configuration without any further processing. The software to be used to provide the required services is characterized by each vendor in an ETF file 304 as described above.

To facilitate the specification of the required services and the cluster, templates can be defined by the configuration generator 306. For example, an SI-template represents the SIs that share common features including the service type, the desired redundancy model: (e.g., 2N, N+M, etc.), the number of active and standby assignments, and the associated CSI-templates. A CSI-template defines the CS type with its number of CSIs. The same concept applies for a node-template. Once the services, cluster description and the software are specified, the configuration generation method proceeds with selecting the appropriate ETF types for each required service.

Figure 4:
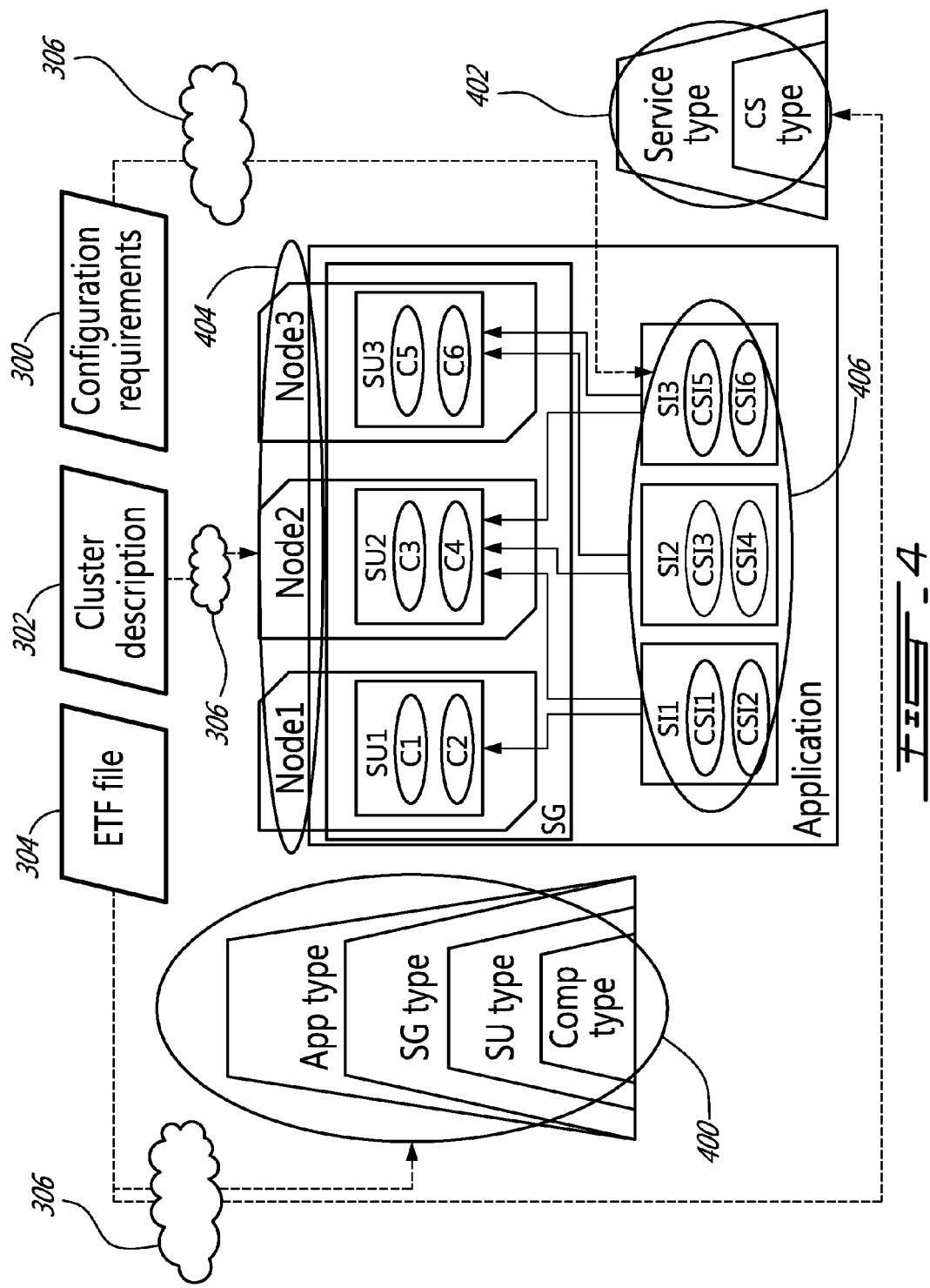
FIG. 4 shows conceptually how the AMF configuration generator of FIG. 3 generates the AMF configuration of FIG. 1.

FIG. 4 illustrates at a conceptual level how each portion of the inputs 300, 302 and 304 are used by the configuration generator 306 to generate an AMF configuration 308, e.g., the configuration 100 shown in FIG. 1. The ETF content 304 will be processed by the configuration generator 306 in order to find the proper types 400, 402 that will be used to derive or build the AMF types. The cluster description is going to be directly used to create the nodes 404. Finally, the information in the SI and CSI template created from the configuration requirements 300 will be processed to be used for two main purposes (1) to create the SIs and CSIs 406 and (2) to select the appropriate ETF types that can support these services. The words "services" and "workload" are used interchangeably herein and, in the context of configuration generation, these terms have the same meaning, which is that the SIs and CSIs that are eventually going to be assigned by AMF to components and SUs. The configuration generator 306 will create the rest of the AMF entities based on the calculations performed on the information that is extracted from the inputs 300, 302 and 304 as described below.

The SI template specifies the required redundancy model, and the number of SUs that will protect the SIs of this template. For instance if the specified redundancy model is 2N, then the SG protecting the SIs will only have one active SU and one standby, and thus any SU of this SG must be capable of supporting all the SIs in their active or standby HA state. The capacity of the SU in supporting the SIs is determined by two factors: the capacity of its components in supporting the CSIs of the SIs, and the number of components that can be grouped in this SU. The component capacity in supporting the CSIs is specified in the component type's capability model defined for the CS type of the CSIs. The maximum number of components of a particular type that can be grouped within an SU is specified by the SU type of the SU. In other words, the types hold all the required information about the capacities of the SUs and their components. Therefore, a significant criterion in selecting any type is the expected load of SIs or CSIs an entity of this type is expected to handle within the SG.

The load of SIs which each SU needs to handle depends on the total number of SIs that the SG has to protect, the protection it needs to provide for each SI, i.e., the number of active and standby assignments, and the number of SUs among which these assignments are distributed. More precisely, for each SI-template, the minimum expected load of an SU for the active and standby assignments is determined as defined by the redundancy model using Equations 1 and 2 below, respectively.

The load of active $SI$ assignments for an $SU$. Equation 1

$$ActiveLoadOfSIs = \begin{cases} \text{ceil}\left(\frac{numberOfSIs}{numberOfSUs}\right) & \text{if } redMod = \text{``N Way''} \\ \text{ceil}\left(\frac{numberOfSIs \times numberOfActiveAssignment}{numberOfActiveSUs}\right) & \text{if } redMod = \text{``N Way Active''} \\ 1 & \text{if } redMod = \text{``NoRedundancy''} \\ numberOfSIs & \text{if } redMod = \text{``2N''} \\ \text{ceil}\left(\frac{numberOfSIs}{numberOfActiveSUs}\right) & \text{if } redMod = \text{``N + M''} \end{cases}$$

The load of standby $SI$ assignments for an $SU$. Equation 2

$$StandbyLoadOfSIs = \begin{cases} \text{ceil}\left(\frac{numberOfSIs \times numberOfStdbAssignment}{numberOfSUs}\right) & \text{if } redMod = \text{``N Way''} \\ 0 & \text{if } redMod = \text{``N Way Active''} \\ 0 & \text{if } redMod = \text{``No Redundancy''} \\ numSIs & \text{if } redMod = \text{``2N''} \\ \text{ceil}\left(\frac{numberOfSIs}{numberOfStdbSUs}\right) & \text{if } redMod = \text{``N + M''} \end{cases}$$

where:

numberOfSUs refers to the total number of SUs of the SG that will protect the SIs of the template, numberOfSIs refers to the number of SIs specified in the SI template, numberOfActiveSUs refers to the number of SUs that have active assignments only, numberOfStdbSUs specifies the number of SUs that have standby assignments only, numberOfActiveAssignments refers to the number of active assignments for each SI, numberOfStdbAssignments refers to the number of standby assignments for each SI, and redMod is used for the redundancy model specified in the SI template.

Note that some of these variables will be redefined below with respect to their usage in a discussion of load balancing for N+M redundancy model systems according to exemplary embodiments.

The above equations use the characteristics of the various redundancy models to determine the load in terms of the number of SI assignments an SU is expected to handle. For example, for the NWay redundancy model, the load of active SI assignments for an SU is calculated as the total number of SIs of an SG of the SI-template divided by the number of SUs since an SI is assigned active to at most one SU and all SUs may handle active assignments. To guarantee that there is always an SU, which can take over the active load of a failed SU, the configuration generator 206 may use numberOfSUs−1 as the number of SUs. For the same redundancy model, the number of SIs an SU can handle in a standby state (in Equation 2) is the number of standby assignments of the SIs divided by the number of SUs. The number of standby assignments of all SIs is calculated as numOJSIs×numberOfStdbAssignments since, in an NWay redundancy model, an SI can have multiple standby assignments. The same principle can be applied to other redundancy models to compute the load of SIs assigned to an SU in both active and standby states.

AMF assigns the CSIs to the components based on the capability of the component type of the components to support the CS type of the CSIs. So, basically within the same SU, if two components of two different types can handle the CS type of a CSI, it cannot be determined at configuration time to which component AMF will assign the CSI. In order to avoid having the CSIs of a particular CS type being assigned to a component of a component type that was not originally selected to support these CSIs, SUs can be created in such a way that, within the types of the component of the same SU, no two component types will overlap in the CS types they can provide. In other words the CSIs of the SI that share the same CS type will be handled by the SU components that share the same component type. This decision affects the component type selection since, now, the load of CSIs of the same CS type cannot be shared among the components of different types, which puts all the load of CSIs on the same type on one component type. Therefore, a significant criterion for the component type selection is its capacity of handling the CSIs load. The issue then becomes how to calculate this load.

The load of CSIs of a particular CS type that the components of the same SU will handle depends on two factors: (1) the number of SIs the SU will handle and (2) the number of CSIs of this CS type each of these SIs contain. Based on the assumption that, within the CSI-templates of an SI template, each CSI-template has a distinct CS type, the load of CSIs of a particular CS type the components of the same SU should handle can be calculated according to Equation 3.

Equation 3. The Load of CSIs a Component Type Must Handle.

$$ActiveLoadOfCSIs = ActiveLoadOfSIs \times numberOfCSIs$$

$$StandbyLoadOfCSIs = StandbyLoadOfSIs \times numberOfCSIs$$

where:

numberOfCSIs refers to the number CSIs specified by the CSI-template for which we want to find the proper component type, ActiveLoadOfSIs refers to the result of Equation 1, and StandbyLoadOfSIs refers to the result of Equation 2.

To select an ETF component type, the CS type of the CSIs as specified in the CSI-template is matched to one of the CS types of the component type. The component capability model of the type should be verified to be compliant with the one required by the redundancy model specified in the SI-template the CSI-template belongs to. Depending on the required redundancy model and the component capability model, certain component types may be more suitable than others, while other component types may not be usable at all. For example, a component type that can have only active or only standby assignments at a time can be used in an SG of the 2N redundancy model, but it is not valid for an SG with N-way redundancy model where the components may have active and standby assignments simultaneously.

In addition, if the component type is checked as part of an SU type, the constraint imposed by the SU type on the component type needs to be verified. The maximum number of components in an SU of this SU type should not be exceeded. This limits the capacity of the SU for a component service type. Therefore, it should be ensured that the maximum number of components of the selected component type can provide the capacity necessary for the load of CSIs, as calculated in Equation 3, imposed by the load of SIs that are expected to be assigned to the parent SU.

Figure 5:
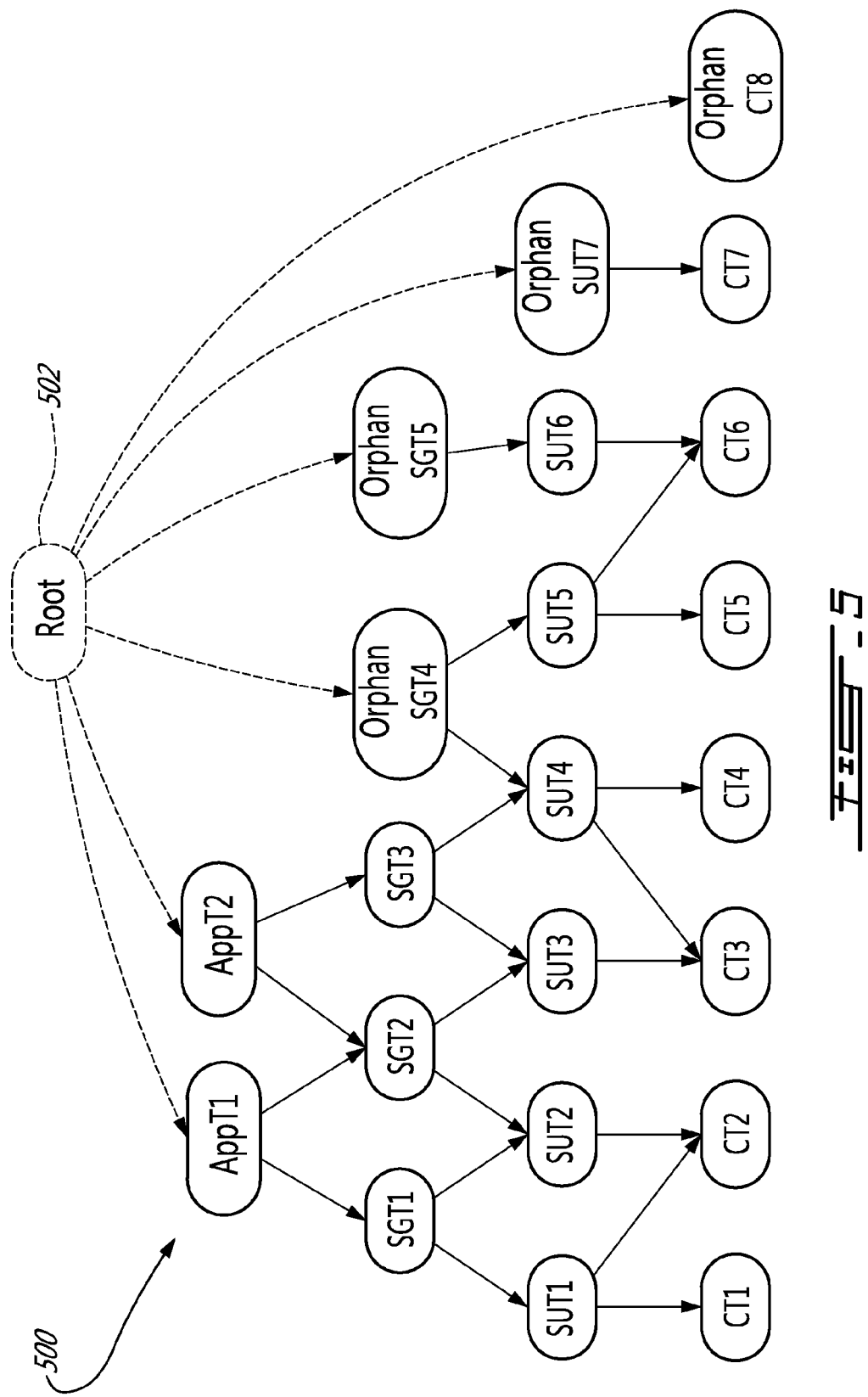
FIG. 5 depicts an Entity Types File (ETF) as a directed acyclic graph.

To determine the suitable SU, SG, and application types for a particular AMF configuration an algorithm can be used to perform a search from the highest defined level of types (i.e., the application type) as will now be described. ETF types can be structured in the form of a "disconnected non-ordered" directed acyclic graph (DAG) an example of which is provided in FIG. 5. The nodes of the DAG 500 represent ETF types, whereas the edges represent the relations among these types. Except for the application type, all other types can have more than one parent type; and since not all types are mandatory in ETF, some types might come with no parents. For example, SG types SGT4 and SGT5 of FIG. 5 do not have a parent application type. A Root node 502 is added to connect the sub-graphs of the DAG 500 to facilitate type searching.

An algorithm for selecting ETF types is given below as Algorithm 1. The function SelectETFTypes takes the DAG as input (i.e., its root node) and an SI-template, and returns as output a set, called Types, which contains the ETF types—if there are any—to provide the services defined by the SI template and that satisfy the constraints that applies to these types, also referred to as requirements. Note that these requirements can change depending on the visited type. For instance, an orphan type may not have the same limitations as a non-orphan one. Moreover, the satisfaction of these requirements may depend on the parent type, e.g. the maximum number of components defined by the SU type and not by the component type. Therefore, it may be necessary to visit the same node several times.

Algorithm 1

```
Types = { }
SelectETFTypes (Node N, SI-template SItemp)
 1.  For each child of N do
 2.      If child satisfies requirements then
 3.          If child is leaf then
 4.              Types = {child}
 5.              ST = {all provided CSTs of child}
 6.              If SItemp.ST ⊆ ST then Return
 7.              For each sibling of child do
 8.                  If sibling satisfies requirements then
 9.                      Types = Types ∪ {sibling}
10.                      ST = ST ∪ {all provided CSTs of
                              sibling}
11.                      If SItemp.ST ⊆ ST then Return
12.              Enddo
13.              Types = { }
14.              Return
15.          Else
16.              SelectETFTpes (child, SItemp)
17.              If Types ≠ { } then
18.                  Types = Types ∪ {child}
19.                  Return
20.  Enddo
```

The initialization step in the above algorithm sets Types to an empty set. The SelectETFTypes function is a recursive function that performs a depth-first search traversal of the DAG starting from the Root node to the component types. More precisely, it starts by visiting the first child of the Root node, which in this case, consists of an application type if provided. The algorithm checks if this application type satisfies the configuration requirements. If this is the case, then the algorithm checks if it is a leaf node and, since it is not, the algorithm continues by recursively visiting the application type's SG types. Otherwise, the algorithm proceeds to the next child of the Root node which could be another application type, an orphan SG type, an orphan SU type or an orphan component type. If the algorithm finds an SG type with a redundancy model identical to the one specified in the SI-template, its SU types are visited.

An SU type is selected by the algorithm if it provides the service type specified in the SI-template and has the capacity, through the components of its component types, to handle the load of SIs (and their CSIs) expected to be assigned to an SU of this type as described above. To determine this, the component types of the SU type also need to be visited. When the first component type is reached and satisfies the requirements as described above, it also satisfies the leaf condition. This component type is added to the selected Types set, and to verify that service type of the SI template can be satisfied a new set is initialized with the CS types of this child and it is checked if the required service can be provided. If it cannot be provided yet, each sibling component type is checked and if satisfies the requirements, then the type itself and its provided CS types are added to the appropriate sets. After each sibling it is verified if the service type of the SI template can be provided. If so, the algorithm returns from the component type level. Alternatively, if the algorithm could not satisfy the service type after visiting all the siblings, then the collected types are cleared and the algorithm backtracks to the SU type level (or Root for orphan components) and selects a new SU type.

On the return path, depending on whether the Types set is empty or not, the algorithm can either continue the search with the next child, or add the current child to the Types set and return to the level above. When the algorithm terminates the Types set may be: (1) a complete type set, i.e. {AppType, SGType, SUType and CompTypes}, (2) a partial type set where some types are missing, e.g. {SUType and CompTypes}, or (3) empty. In the case where Types set is empty, the algorithm could not find any types to satisfy the configuration requirements. Therefore, no configuration can be generated to provide the requested services using the software described by the given ETF(s). In the case where the Types set is a complete set, all the necessary types have been identified by the algorithm. For the second case in between, the creation of some missing types is required. Algorithm 2 presented below can be used to create the missing types. This algorithm selects the orphan type(s) in Types and, as long as there is no application type in Types, it builds a new type from the last selected type(s) according to the SI-template.

Algorithm 2

```
CreateTypes (TypeSet Types, SI-template SItemp)
 1.  lastType = orphan types in Types
 2.  While AppType ∉ Types do
 3.      Build newType from lastType for SItemp
 4.      Types = Types ∪ {newType}
 5.      lastType = newType
 6.  Enddo
```

Once ETF types are selected (or created), the corresponding AMF types are derived, and the corresponding AMF entities are generated. AMF types are created from the selected ETF types by deriving their attributes from the attributes provided in the ETF prototypes. In most cases this means using the default value provided for the type. In other cases, the AMF type is tailored to the intended use. For example, if an ETF component type can provide CST1 and CST2 CS types, but the type was selected to provide only one of them (e.g. CST1), in the AMF type only this component type is listed as provided CS type.

For created types, the AMF type attributes are derived based on the dependencies that can be established among the used ETF prototypes. For example, the default instantiation level of ETF component types of a created SU type is calculated based on the dependency of their provided CS types if any. Once all the AMF types have been supplied, their entities are created. For this again for each SI-template the number of components is determined within each SU of the selected SU type. This is based on the load of SIs expected to be assigned to the SU (Equations 1 and 2 above), the number of CSIs within these SIs, as well as the capability of the components, specified in the component type of these components. For example, if the SU can handle one SI, which contains four CSIs in a 2N redundancy model and that the component capability is 2 active and 3 standby then the number of components for this SU should be 4/2=2. In other words, the configuration only needs two components to be active for the four CSIs. The configuration also needs two components of this type in the standby SU to handle the four CSIs (using the ceiling of 3/2).

From the first created SU all the necessary SUs are duplicated to create the SG, which might also be duplicated to satisfy all the SIs of the template. The process is repeated for each SI-template. SGs are combined into applications based on the selected application types.

Thus far, the process described above has created the skeleton of the AMF configuration. That is, all the AMF types and the entities have been created; however it still remains to populate the remaining attributes of the AMF entities. The values of these attributes come from three sources: (1) ETF, for instance the types' attributes values are mostly derived from the values specified in ETF, (2) the configuration designer, for example the SI and CSI attribute values, and (3) the configuration generator, in the sense that some values must be computed. Among the computed values, some are calculated in a straightforward manner while others require deeper analysis. The SU ranking for SIs is one of the latter attributes. The SU ranking for SIs is a significant attribute that should be carefully set in order to ensure SI load balancing among the SUs of the same SG before and after failure. The embodiments below discuss this attribute in more detail and mechanisms for ensuring that the backup roles and active assignments are distributed among the SUs in a manner which achieves this objective.

Service Unit Ranking for Service Instances Amidst Load Balancing Concerns for N+M Redundancy Models As mentioned above, the workload assigned to the SUs is abstracted by SIs, and assigned to SUs by AMF at runtime. SUs collaborate to protect SIs within an SG, that is, when an SU fails, only an SU(s) of the same SG can take-over the load originally assigned to the failed SU. Two issues can arise in the context of the workload assignment depending upon the redundancy model which is being used, i.e., (1) the SIs should be evenly distributed among the SUs of the same SG and (2) when an SU fails, the workload assigned to this SU should be evenly redistributed among the other SUs of the SG in order to avoid a load misbalance.

SI assignment to SUs can, for example, be performed using a ranked list. Considering again the exemplary AMF configuration shown in FIG. 1, an NWay SG 104, consists of three SUs, and is protecting three SIs. The runtime active assignment shown in FIG. 1 can correspond to a certain ranked list of SUs configured for each SI, an example of which is shown in Table 2. The number of SUs that will be assigned the active/standby state is defined by the preferred number of active/standby assignments configured for the SI. Initially the SUs with the highest ranks in the table (lowest integer values) will be assigned the active/standby state on behalf of the SI. In case of an SU failure, the SU with the next highest rank will get an assignment. For example, according to Table 2, if SU1 fails then SI1 will lose its active assignment. AMF will restore this active assignment by assigning the SI to another SU. SU2 is the standby because it has the next highest rank and therefore will inherit the active assignment. And SU3 will become the new standby because it has the next highest rank after the standby, we will refer to such SU later on as the backup-standby. In the example of FIG. 1, it is assumed that each SI is configured to have exactly one standby assignment, however other configurations are possible. Moreover, it will be appreciated by those skilled in the art that other rankings are possible and other equivalent rankings could lead to the same assignment shown in FIG. 1.

TABLE 2

The ranked list of SUs for SIs.

| | SU1 | SU2 | SU3 |
|---|---|---|---|
| SI1 | Rank = 1 | Rank = 2 | Rank = 3 |
| SI2 | Rank = 3 | Rank = 1 | Rank = 2 |
| SI3 | Rank = 3 | Rank = 2 | Rank = 1 |

The following embodiments consider issues associated with such assignments and assignment tables, while also considering balanced loading and possible SU failures from the perspective of systems using the N+M redundancy model.

For the purposes of this section, the following parameters are defined (or redefined to the extent that they were used above):
numberOfSIs: refers to the total number of SIs that will be protected by the SG.
numberOfSUs: refers to the total number of SUs in the SG.
numberOfActiveSUs: refers to the preferred number of active SUs that is specified in the AMF specification for the N+M redundancy model. This parameter is noted as "preferred" herein, because in certain cases the number of active SUs may differ from the "preferred" number, e.g., when there is an SU shortage due to failures.
numberOfStdbSUs: refers to the preferred number of standby SUs that is specified in the AMF specification for the N+M redundancy model. Again this parameter is referred to as a "preferred" value because in certain cases the number of standby SUs may differ from the "preferred" number, e.g., when an active SU fails, and a standby needs to presume the active role and all SUs had assignments.
numberOfActiveAssignments: refers to the number of active assignments an SI will have at runtime. The value of this attribute is always set to '1' for the N+M model (in the NwayActive where an SI can have more than '1' active assignment).
numberOfStdbAssignments: refers to the number of standby assignments an SI will have at runtime. The value of this attribute is '1' for the N+M model (it can be '0' or more than '1' for other redundancy models).

In ideal situations, it would be desirable for the active load of the active SUs in an AMF system to be perfectly balanced, and the standby load of the standby SUs to be in perfect balance as well. Moreover, since systems considered herein are preferably fault tolerant systems with no single point of failure, it would also be desirable to maintain this perfect balance after a failure occurs. However it will be demonstrated below that this is not always possible without making certain compromises.

Recall first of all the equations for an N+M redundancy model (described above) that are used to calculate the balanced active load (of SIs) and the balanced standby load that ideally an SU must handle:

The balanced active load per $SU$ in $N+M$     Equation 4

$$Active = \left\{ \begin{array}{c} \left\lfloor \dfrac{numberOfSIs}{numberOfActiveSUs} \right\rfloor \\ or \\ \left\lceil \dfrac{numberOfSIs}{numberOfActiveSUs} \right\rceil \end{array} \right.$$

The balanced standby load per $SU$ in $N+M$     Equation 5

$$Stdb = \left\{ \begin{array}{c} \left\lfloor \dfrac{numberOfSIs}{numberOfStdbSUs} \right\rfloor \\ or \\ \left\lceil \dfrac{numberOfSIs}{numberOfStdbSUs} \right\rceil \end{array} \right.$$

In other words, the balanced active load for some of the active SUs is the ceiling value of the number of SIs divided by the number of active SUs, and for others it is the floor value of the same fraction. The balanced standby load is calculated in the same way for the standby SUs. Floor and ceiling functions are used in equations 4 and 5 since the division may not always yield an integer value.

Achieving a balanced load that satisfies both equation 4 and 5 can, for example, be performed using a round robin approach to distribute the active assignment of the SIs among the active SUs, and likewise round robin can be used to distribute the standby assignment among the standby SUs. This approach guaranties load balancing before a failure, when all the SUs are healthy, but can cause adverse consequences after a failure as shown below.

The first shortcoming of round robin in this context is that it does not associate the active SU with the standby SU. In other words a round robin approach does not take into consideration the implicit relation that exists between an active SU for a particular SI and the counterpart standby SU. This relation can be defined as follows: it suffices that the standby SU be a standby for any of the SIs assigned to the active SU, so that in case this active SU fails, the standby SU will turn into the active SU. The consequence of this relation is the following, if $SU_i$ is assigned the active state on behalf of x SIs, and for each of these SIs a different standby SU is assigned the standby state, when $SU_i$ fails, it will be replaced by x standby SUs.

The assignments shown in FIG. 2 exemplify this point. When, for example, SU6 fails, it will be replaced by SU8 and SU9. The possible manifestations of this shortcoming of the round robin approach arise after a failure occurs. These shortcomings can be summed up as follows: (1) if one active SU is replaced by multiple standby SUs, then the load that was once handled by this active SU (that is equivalent to the load handled by its sibling active SUs) is now split among several SUs, causing a misbalance of the active assignments, (2) unnecessary sacrifices are being made among the standby SUs, where in a worst case scenario, the failure of one active SU may cause the loss of all the standby SUs by turning them into active SUS, and (3) using this round robin approach, AMF may violate the preferred number of active SUs (numberOfActiveSUs) specified by the system designer in the AMF configuration.

A second shortcoming of round robin is that is does not take into account what happens with the standby assignments after failure. That is, when an active SU fails, and a standby SU takes over, the round robin approach does not provide for what happens to the standby assignments originally assigned to the standby SU, e.g., whether they are evenly distributed among other SUs or if they are dropped, etc.

In order to overcome the shortcomings of the round robin approach, exemplary embodiments provide, for example, for the following three results: (1) ensure that each SU gets assigned the active or standby assignment value specified in Equation 3 or 4, (2) ensure that no active SU is replaced by more than one standby, and (3) ensure that when a standby SU fails or becomes active its standby load is properly reassigned. Note that, however, it may not be possible to satisfy these three results simultaneously as will be discussed below.

Consider the following example: 5 SUs (3 active and 2 standbys) serving 30 SIs. Balancing the active load of the active SUs according to Equation 4, each active SU handles 30/3=10 SIs in their active state. With the constraint that the sum of all active assignments=30. Similarly, Equation 5 states that each standby SU must handle 30/2=15 SIs in their standby state. Again with the constraint that the sum of all assignments=30. FIG. 6 shows the only possible distribution 600 of those assignments among the SUs.

So far in this example, the balancing of the load before failure has been established. In order to make sure that when an active SU fails it is replaced by exactly one standby, all of the SIs assigned to the active SU must be re-assigned to at most one standby SU. In other words each standby SU must be standby to a discrete number of active SUs, e.g., SU4 must be standby for 1, 2, or more active SUs. Normally an SU is a standby for an SI. When it is stated herein that $SU_x$ is a standby for another active $SU_y$, this means that $SU_x$ is a standby for all of the SIs that are assigned to the active SU. However, if SU4 is standby for only one SU, then it will be assigned only 10 standby assignments (since each SU has 10 active assignments), and if SU4 is a standby for two SUs, it will be assigned 20 standby assignments (exceeding the desired value of 15). In both cases such assignments violate the balanced number of standby assignment calculated for SU4. Otherwise stated, no combination of 1, 2, or more SUs will have the sum of 15 active assignments for which SU4 can be the standby for. So basically in this example, when the active and standby loads are perfectly balanced, it cannot guaranty that when any SU fails, it will be replaced by only one standby. Various embodiments are now presented which address these issues.

According to one embodiment, an approach for load balancing a system which uses an N+M redundancy model targets four main issues, e.g., (1) maintain the active load balanced before and after failure, (2) make sure that no active SU is replaced by more than one standby SU, (3) make sure that each standby SU is a standby for an equal number of active SUs±1, with the constraint of keeping the standby load as balanced as possible, i.e., the difference in the standby load between the SU with the maximum standby assignments and the SU with the minimum ones is kept to a minimal value (less or equal to the floor value of the result of Equation 4), and (4) make sure that the standby load of an SU is re-distributed among the other standby SUs with the constraint of keeping the standby load as balanced as possible.

When the active load is balanced before failure and any active SU is replaced by exactly one standby SU after failure, this automatically means that the active load will remain balanced after the failure as well. Before presenting an exemplary algorithm that implements this approach, a standby assignment table is first defined. The standby assignment table is an artifact which is defined in order to visualize the solution in the form of a table that simultaneously displays the active and standby assignments, but is not required to be used by any of the embodiments described herein.

FIG. 7 illustrates an example an unfilled standby assignment table 700. Therein, the columns are indexed by the standby SUs and the rows are indexed by the active SUs. The rightmost column of table 700 holds the value of the balanced active assignments an SU must handle. This balanced active assignment value is one of the outcomes of Equation 4.

The bottom row of table 700 will hold the value of the standby assignments that a standby SU will handle. This standby assignment value, however, is not necessarily the outcome of Equation 5 since, as stated above, this approach does not target the issue of balancing the standby assignments but instead sacrifices this balance in favour of ensuring that an active SU is not replaced with multiple standbys. The values in the cells of the standby assignment table 700 are interpreted as follows: a value x in the cell ($SU_i$, $SU_j$) means that $SU_j$ is standby for x active assignments of $SU_i$.

An embodiment which performs load balancing for, e.g., an AMF system using an N+M redundancy model and addresses the four above-identified issues using a standby assignment table 700 will now be described with respect to the flowchart of FIG. 8. This embodiment, among other things, aims at balancing the active assignment while keeping the standby assignments as balanced as possible acknowledging the fact that a complete standby balance may not be possible. This is accomplished by calculating the active load that the SUs must handle at step 800, populating the standby assignment table by giving each SU an active assignment value at step 802 and distributing the standby assignments as evenly as possible without splitting the active assignments of any SU among more than one standby at step 804.

The process according to this embodiment continues to balancing the standby load after failure a step 806, i.e., to ensure that when a standby SU turns active or fails for some reason, its standby load is re-distributed among the other standby SUs in a way that favors standby load balancing. This step 806 can also be referred to as a 'per SU standby load balancing' algorithm, since balancing is performed per SU and not per SI as discussed further below. Then, at step 808, the data associated with the previous steps can be used in some manner by the system to coordinate the load balancing, e.g., by generating a ranked list of SUs that satisfies the criteria set forth for this approach at step 808.

Figure 8:
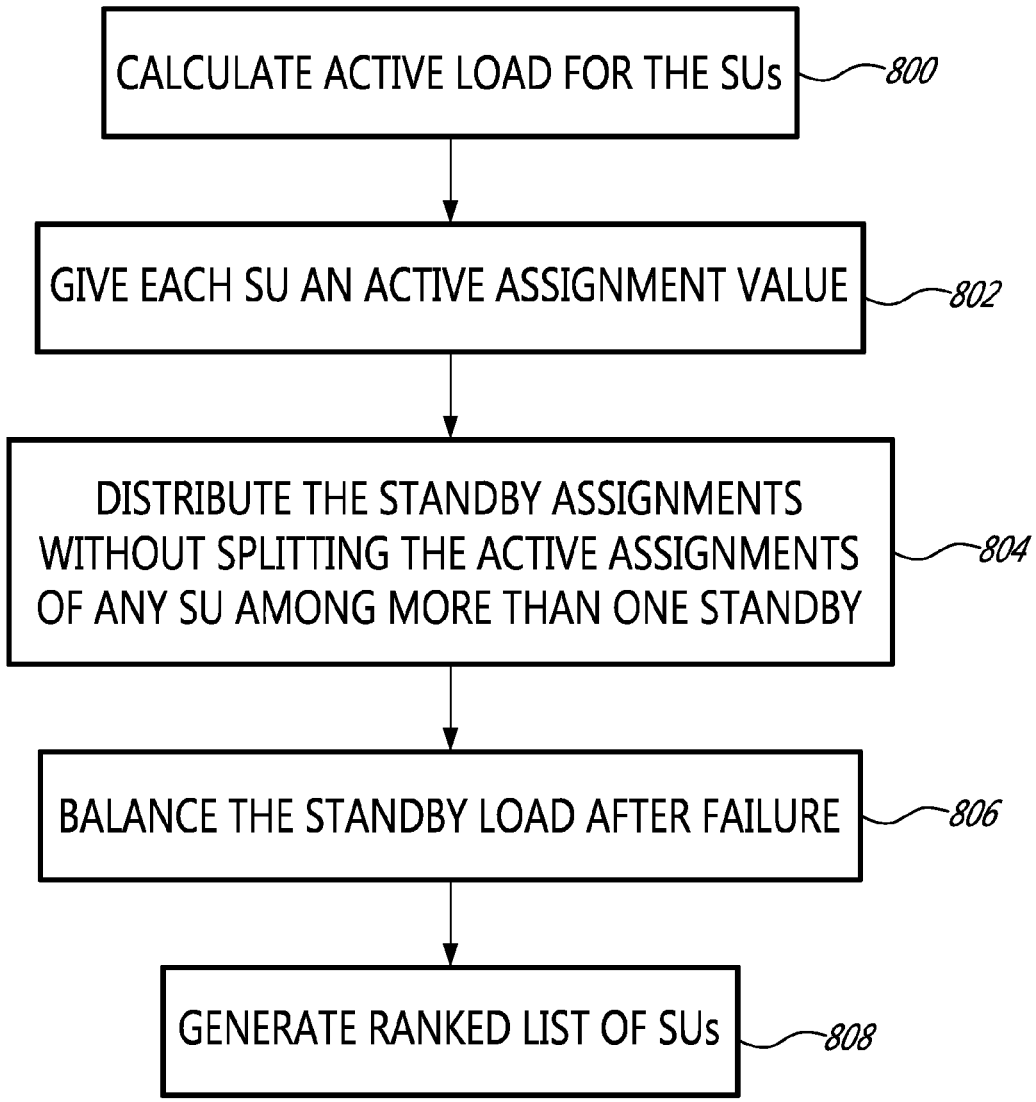
FIG. 8 is a flowchart depicting a method for balancing active workload assignments and standby load assignments according to an embodiment.

In order to more fully appreciate the embodiment of FIG. 8, an illustrative example of its application will now be provided. In this example, assume that an SG with N+M redundancy has 7 active and 4 standby SUs (as shown in FIG. 2), which SG is protecting 23 SIs. For this example, step 800, i.e., calculating the active load of SIs, is based on Equation 4 above. Some SUs are going to be assigned the ceiling value of the result, while others will be assigned the floor. This is due to the fact that an SI cannot be split among two SUs. What remains to be determined is how many of each (ceiling and floor) assignments exist, which can be determined by equation 6 below.

$$numberOfCeilValues = \left\{ decimalValueIn\left(\frac{numberOfSIs}{numberOfActiveSUs}\right) \times numberOfActiveSUs \right\}$$

Number of SUs with the ceil value of the active assignment     Equation 6

Equation 6 also works when calculating how many standby SUs will get the ceiling value of the standby assignment by replacing numberOfActiveSUs with numberOfStdbSUs in the equation. What is meant here by decimal value is the non-integer part of the result of the division or in other words the fractional value e.g., decimalValueIn(5/4)=decimalValueIn(1.25)=0.25. The rest of the active SUs will get the floor value, that is, they will be assigned one less SI than the others.

Applying step 800 to this numerical example results in determining that the balanced active load that each SU must handle, according to Equation 4, is equal to:

$$Active = \left\{ \begin{array}{c} \left\lfloor \frac{23}{7} \right\rfloor \\ or \\ \left\lceil \frac{23}{7} \right\rceil \end{array} \right\} = \left\{ \begin{array}{c} \lfloor 3.285 \rfloor \\ or \\ \lceil 3.284 \rceil \end{array} \right\} = 3 \text{ or } 4$$

The number of SUs that will get to be active for 4 SIs is equal to:

numberOfCeilValues={decimalValueIn(3.285)× 7}=0.285×7=2

This means that 2 SUs will get to be active for 4 SIs and the rest (7−2=5) will be active for 3 SIs.

For step 802, the standby assignment table 700 is populated with the values that were calculated in step 800. The table 700 can initially be populated using any desired allocation mechanism since in the next step 804 the table 700 will be balanced by reshuffling the cell value. However, for performance reasons, the active load values can be distributed into the table 700 in a round robin manner, so that the table would be more balanced and the algorithm of step 804 will run fewer times.

Figure 9:
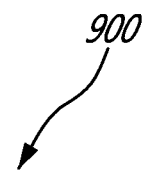
FIG. 9 depicts a populated assignment table.

Applying step 802 to the numerical example being discussed here is shown in FIG. 9, which thus illustrates how the standby assignment table can, for example, be populated based on the results of the calculations in step 800. The active assignment was randomly distributed among the SUs in this table 900. However this causes a significant misbalance in the standby assignments. The bottom row of this table, which is the sum of the cell values of each column, reflects this misbalance. For instance SU8 is standby for SU1, SU2, and SU3 while SU9 is only standby for SU4. As of this step, the active assignment is totally balanced, i.e. each SU s active for three or four SIs as the values in the SU rows indicate.

Accordingly, in step 804, the table 900 is balanced so that each standby SU is a standby for an equal number of active SUs (±1) compared to its standby siblings. An exemplary algorithm, shown in FIG. 10, takes as input a standby assignment table populated with the active values, and then balances the standby assignments within the table by granting each standby SU the proper number of active SUs that have the proper number of active assignments. More specifically, the algorithm in FIG. 10 consists of two procedures. The first one 'isBalanced( )' checks whether the table is balanced or not. The second procedure 'solveOneActiveForOneStandbyCSP( )' solves the problem of balancing the table without violating the constraints of active load balancing and maintaining the standby assignments as balanced as possible. The variables definitions used in this algorithm (and subsequent algorithms described below) are as follows:

maxStdbSUColumn: is the column with the maximum sum of cell referring to the SU with the most standby assignments.

minStdbSUColumn: is the column with the minimum sum of cell referring to the SU with the least standby assignments.

Active: is the result of Equation 4 without being rounded to the nearest floor or ceiling value.

[xxxStdbSUColumn]: The brackets denotes the sum of the values of the cells of the column enclosed.

The result of applying the algorithm of FIG. 10 to the exemplary standby assignment table 900 is graphically illustrated in FIG. 11. Therein, the result is a balanced standby assignment table 1100 where each SU is a standby for an equal number of active SU (±1). Moreover the algorithm continues toward balancing the standby load as much as possible, e.g., SU10 (the SU with the least standby assignments) could have been a standby for an SU with 3 active assignments, which would create a difference of 4 active assignments (>floor value of Equation 4) compared to the SU8 (the SU with the most standby assignments), which is an undesired outcome.

Figure 12:
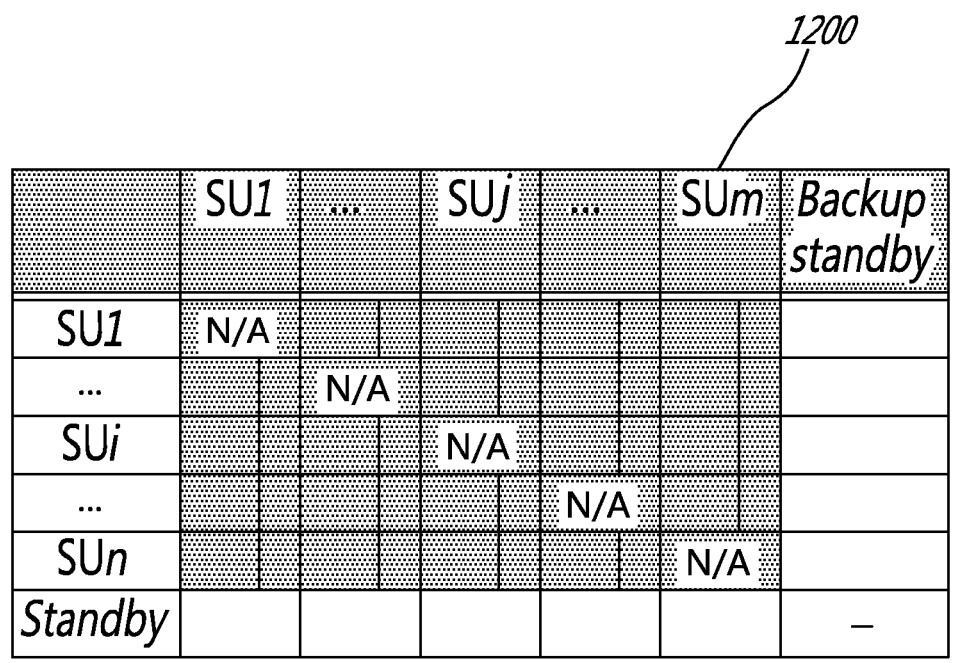
FIG. 12 depicts a backup standby assignment table according to an embodiment.

Step 806 can be performed to find a best possible redistribution of the standby load among the standby SUs when one standby SU is lost, i.e., fails. Here the 'backup-standby' notation is introduced, which is a virtual assignment that does not imply any actual load on the SU and which is not defined in the AMF specification. If a $SU_x$ is assigned the backup-standby assignment for a certain SI, this means that when the standby SU for this SI fails, $SU_x$ will become the standby SU for this SIs. Again another table is introduced, namely the 'backup-standby table' to capture this relationship. This backup standby table (an example of which is shown in FIG. 12 as table 1200) gives a simultaneous view of the standby and the backup-standby assignments.

In the backup-standby assignment table 1200, the columns are indexed by the standby SUs and the rows are also indexed by the standby SUs. The rightmost column in table 1200 holds the value of the backup-standby assignments an SU will handle. The bottom row in the table 1200 will hold the value of standby assignment that a standby SU will handle. The values of this bottom row are the same ones that appear in the bottom row of the standby assignment table that was balanced in Step 804. Also note that the cells of this table 1200 have margins. Those margins are going to hold certain values that will be used in the calculations. The values in the cells of the backup-standby assignment table 1200 according to this embodiment are interpreted as follows: a value x in the cell ($SU_i$, $SU_{j\ where\ i \neq j}$) means that $SU_i$ is backing up x standby assignments of $SU_j$. The margins are used to reflect the extra standby load that a certain SU possess compared to the SU with the minimum standby load. The objective here is that after a standby SU fails, as it is desirable to be fair in the way the failed SU's load is re-distributed, and consider the original misbalance in the standby load.

The backup-standby assignment table 1200 can be populated with the proper values by following, for example, the three sub-steps below:
1. The standby row is filled with identical values of the standby row of the balanced standby assignment table.
2. The margins of each row of SUi are filled with the following value:

(standby load of SUi−minimum standby load among the standby SUs)

3. For each column: calculate the sum of all the column margins plus the value in the standby cell in this column, let this value be known as tempSum.
    a. For each column: distribute tempSum equally among the cells of this column. Each cell will get a temporary value of:

Temporary cell value                                    Equation 7

$$tempCellValue = \begin{cases} \left\lfloor \frac{tempSum}{numberOfStdbSUs - 1} \right\rfloor \\ \text{or} \\ \left\lceil \frac{tempSum}{numberOfStdbSUs - 1} \right\rceil \end{cases}$$

b. Subtract from each cell value, the value in the cell's margin.

Applying step 806, by way of the three sub-steps described above and as first illustrated in FIG. 13(*a*) for sub-steps 1 and 2, to the ongoing example results in the backup-standby table's bottom row being filled with the standby values of the balanced standby assignment table from FIG. 11, as seen in row 1300 of table 1302. Then the margins are filled per row. For example SU8 has 7 standby assignments, which means it has (7−4) 3 extra assignments compared to the SU with the minimum standby assignments (SU10), therefore the margins of the row of SU8 are filled with the value of 3. The same process is repeated for each row.

Referring now to FIG. 13(*b*) which shows the table 1302 after sub-step 3 described above has been performed, each value in the standby row is divided among the cells of the corresponding column. For example SU8 has 7 standby assignments, when SU8 fails or turns active; the standby load of SU8 is reassigned to the other SUs. In this approach one aim is to keep the standby load balanced among SUs. Distributing the 7 standby assignments of SU8 equally among the other SUs is not going to favor load balancing since the SUs have originally different standby loads. At this time, the values assigned to the cells margins can be used in the calculations. For example in the column of SU8 notice from the margins of that column that SU9 and SU11 already have 2 extra standby assignments compared to SU10 (the SU with the least standby assignments). This is why SU10 is going to backup most (4) of SU8 (7) standby assignments. The values of the columns 'cells are calculated using sub-step 3 described above. For example for the column of SU8 the sum of the margins (2+0+2) plus the standby value (7) is equal to 11. Based on Equation 7: [11/(4−1)]=3.66. Therefore '11' is going to be divided into 4+4+3. And each cell of the SU8 column is going to be assigned one of these values. One possible distribution is to give SU9 a '4', SU10 a '4' and SU11 a '3'. Next, the margin values are subtracted from the cell values leaving SU9 with (4−2=2), SU10 with (4−0=4) and finally SU11 with (3−2=1) backup-standby assignments. Notice that the values in the cells of the backup-standby column of table 1302 in FIG. 13(*b*) are not balanced, however this is acceptable since the backup-standby assignment is not a real load and has no weight.

Figure 14:
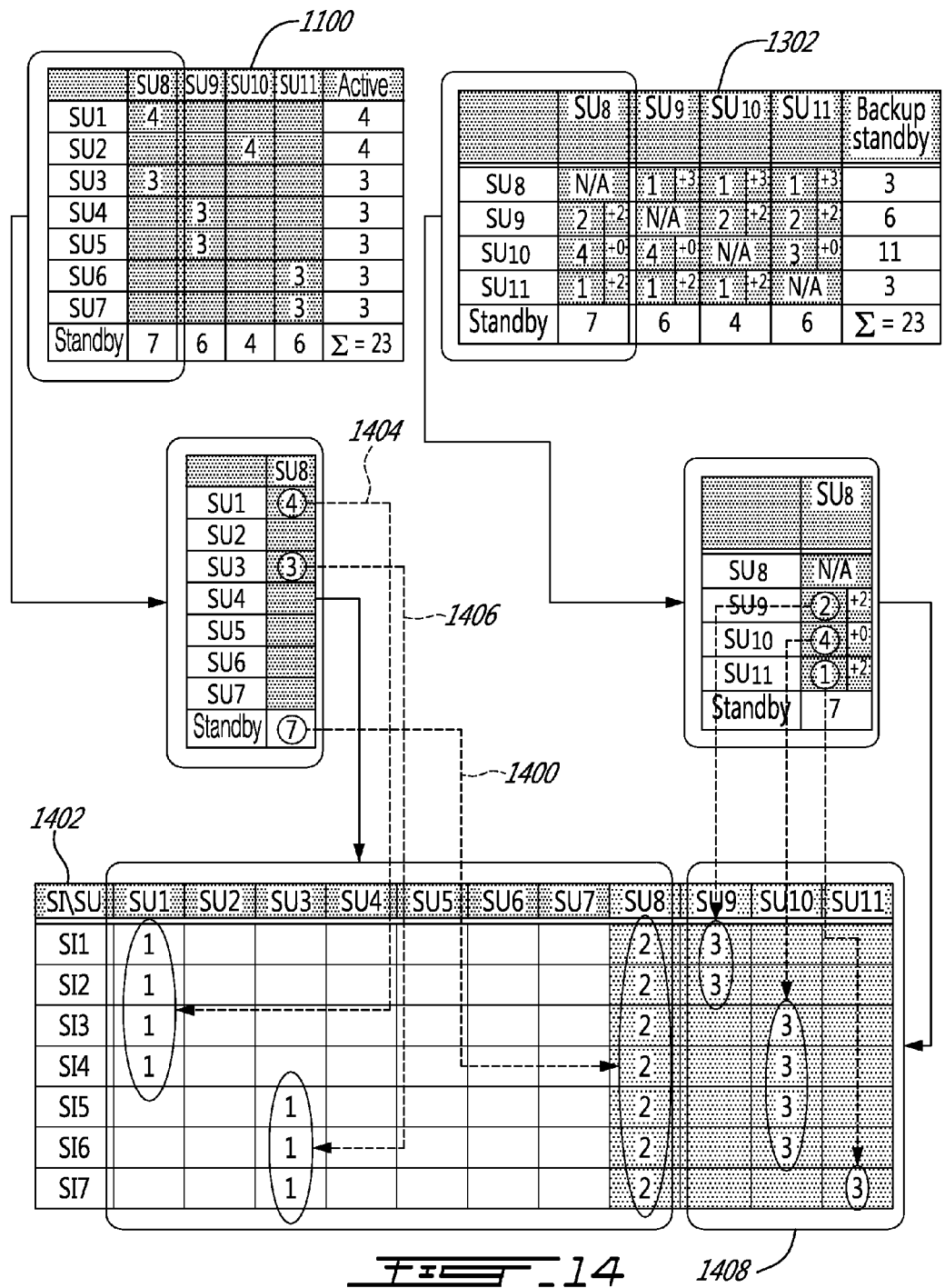
FIG. 14 illustrates deriving a ranked list of service units according to an embodiment.

The final step according to this embodiment is to apply the values which have been generated via steps 800-806 to enable load balancing. One way to do that is to generate a data structure which can be used by, for example, an AMF system to perform load balancing. Step 808 indicates the derivation of a ranked list of SUs, however it will be appreciated that other data structures or applications of such values can be used instead. FIG. 14 illustrates the process of deriving the ranked list of SUs for one SU, i.e., SU8, using both of the balanced tables 1100 and 1302 discussed above. Using the balanced standby assignment table 1100 each standby $SU_j$ is given a rank of '2' for the number of SIs for which it is a standby. For example, as shown by dotted line 1400, SU8 is standby for 7 SIs and, therefore, a rank of 2 is assigned to, for example, the first seven SIs in ranked list 1402.

For each SU that is supposed to be active for these SIs, a rank of '1' is assigned. For SU8, the balanced table 1100 shows SU1 and SU3 as being the active SUs for the SIs for which SU8 is standby. Thus, as shown by dotted lines 1404 and 1406, '1's are placed in the ranked list 1402 for four SIs for SU1 and 3 SIs for SU3.

Based on the balanced backup-standby assignment table 1302, each SU that is supposed to back up the standby assignments of $SU_j$ is given a rank of '3' for the number of backups it is supposed to handle. For example for SU8, as shown in the portion 1408 of the ranked list 1402, SU8 backs up two standby assignments for SU9, four standby assignments for SU10 and one for SU11.

Figure 15:
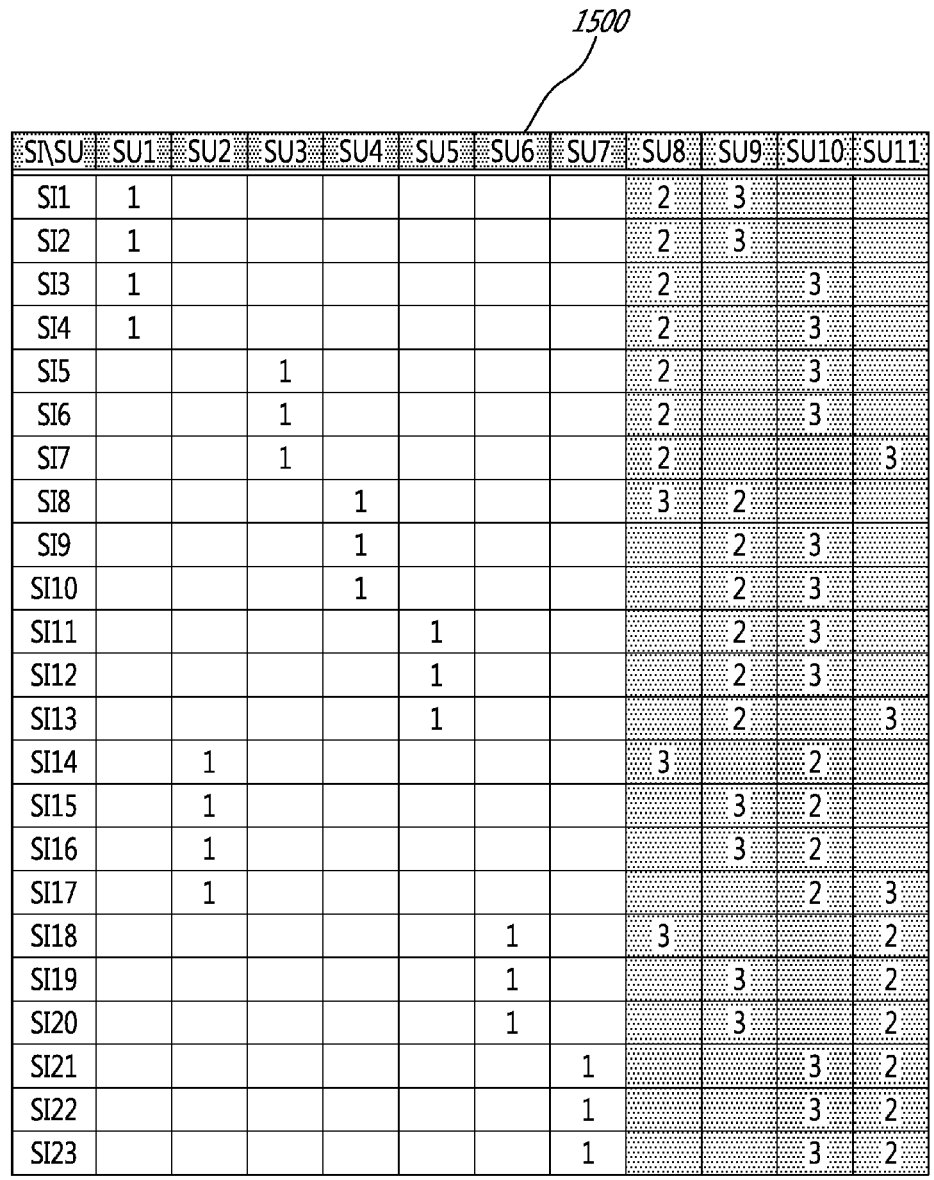
FIG. 15 is a ranked list of service units according to an embodiment.

The process described above for SU8 is repeated for all of the SUs until the complete ranked list of SUs is derived. FIG. 15 shows such a ranked list 1500 for this example using this "one active for one standby approach according to this embodiment. Note that in list 1500 some cells are empty of rank values, implying that the value is higher than 3 since this embodiment is concerned with only a single point of failure.

To summarize, in the foregoing example an illustrative example was provided for the "the one active for one standby" embodiment for load balancing in an AMF system having N+M redundancy. In this example, two assignment tables were derived. In the balanced standby assignment table, the active assignment is balanced before and after a failure occurs, and each failed active SU is replaced by exactly one standby SU. More specifically, and just for this purely illustrative example, it can be seen that all active SUs have equal active assignments for 3 or 4 SIs. When an active SU, like SU1 fails, all of its 4 active assignments are transferred to SU8. In the balanced backup-standby table, it was ensured that when a standby SU fails or turns active, its standby load is re-distributed in a way that favors standby load balancing among the other standby SUs. For example, when SU8 turns active, its 7 standby assignments are going to be re-assigned 2 for SU9 giving it a total of (6+2=8 standbys), 4 for SU10 giving it a total of (4+4=8) standbys, and 1 for SU11 giving it a total of (6+1=7) standby assignments.

In the foregoing exemplary embodiment, using the one active for one standby approach, the load of one standby was distributed among several standby SUs to favor the standby load balancing after failure. But when balancing the standby load is not a priority for a given implementation or system, and the priority is instead to always have one standby for each active SU even after a failure, then the 'one active for one standby' approach can be modified according to another embodiment to accommodate this priority. In this embodiment, the first three steps of the 'per SU standby load balancing' algorithm of the one 'active for one standby' approach, i.e., steps 800-804 in FIG. 8, can be reused here a change. However the third sub-step of step 806 is modified according to this embodiment as follows. For each column in the backup standby assignment table, assign all the standby assignments to the SU with the lowest value in the margin of its cell. Stated differently, this modification to the balancing process means that when a standby SU turns active or fails according to this embodiment, all of its standby load is assigned to the SU with the lowest standby load.

To illustrate how this second embodiment differs from the first, consider again the case study described above for a system with an SG with N+M redundancy that has 7 active SUs and 4 standby SUs (as shown in FIG. 2), which SG is protecting 23 SIs. FIGS. 16(a) and 16(b) show the backup standby assignment table 1600 which is generated according to this embodiment. Therein, it can be seen in FIG. 16(a) that the backup standby assignment table 1600 is the same as the table 1302 in FIG. 13(a) through sub-steps 1 and 2 of step 806, since the process is the same for those two sub-steps. However comparing table 1600 in FIG. 16(b) with table 1302 in FIG. 13(b), it can be seen that only one SU (i.e., the SU with the lowest margin value) gets the entire standby load of another standby SU which fails or goes active.

The process for deriving the ranked list of SUs for this second embodiment is similar to the one defined above for the first embodiment, the only difference is that for each standby SU there is exactly one backup-standby SU. This can be seen in the ranked SU list 1700 illustrated in FIG. 17 and by comparing the list 1700 with the list 1500 in FIG. 5 and noting the different distribution of the '3' ranking values as between the two lists.

According to a third embodiment, the load can be completely balanced while the system is in its healthy state, i.e., before any SU failures. Referred to herein as the 'complete balance before failure' approach for load balancing in N+M, this embodiment targets three main issues:
1. Maintain the active and the standby load completely balanced (±1) before a failure
2. Make sure that no active SU is replaced by more than two standby SUs after a failure
3. Make sure that the standby load of each SU remains balanced (±1) even after a failure However in order to achieve these objectives, it may be necessary to sacrifice the constraint that one active SU be replaced with only one standby after a failure. This, in turn, has two potential downsides after a failure occurs. First, two standby SUs may be lost and second, the active load assigned to these two standbys is going to be less than the active load assigned to the other SUs, and thus the active load is not going to remain completely balanced after failure. On the other hand, when the failures in the system are rare, and rapidly fixed, this may be a suitable approach to follow. It should also be noted that with this approach, after a failure occurs, the preferred number of active SUs may be violated.

Figure 18:
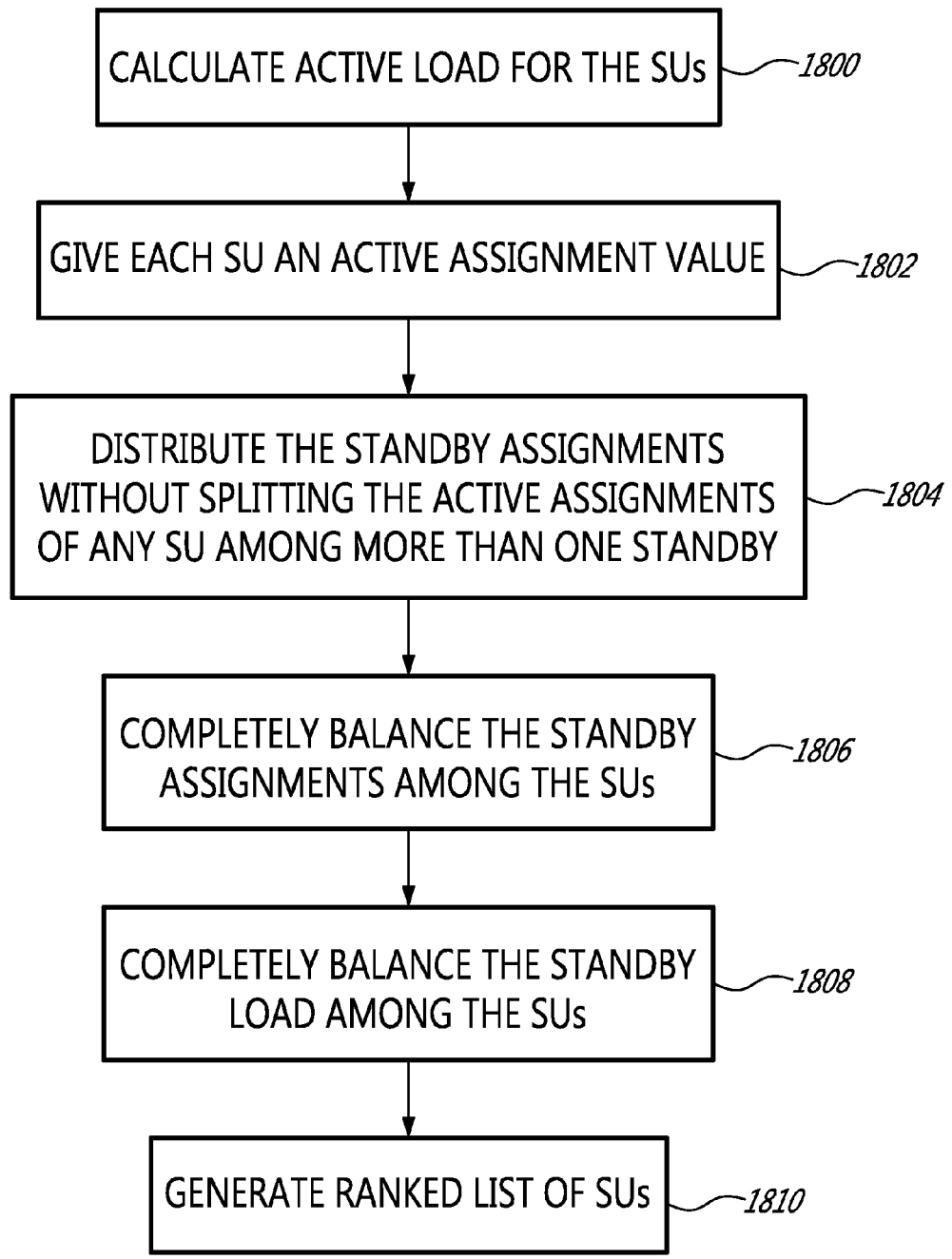
FIG. 18 is a flowchart illustrating a method for balancing active loads and standby loads according to another embodiment.

An exemplary method for balancing a load in a system using an N+M redundancy model according to this third embodiment is shown in FIG. 18. Therein, steps 1800-1804 are the same as steps 800-804 in FIG. 8 in the above-described embodiments and are not further discussed here. However, starting with step 1806, the method of FIG. 18 begins to balance the standby load per SI. More specifically, at step 1806, the standby assignments are completely balanced among the standby SUs, even if performing such a complete balancing means having for one active SU more than one standby, with the constraint that no active SU gets replaced by more than two standbys. At step 1808, the standby load is completely balanced, at least to within ±1, among SUs after an SU failure. As an output, a ranked list of SUs can be derived or generated at step 1810, although as described above other data structures or implementations of the generated data can be used in the alternative to balance loading in a system.

Describing first step 1806 in more detail, this step involves, for example, calculating the balanced standby load (±1) and assign that balanced standby load to each standby SU. To visualize this additional step, an extra row can be added to the standby assignment table, which is referred to in the example given below in FIG. 20 as the "desired standby" row. The values of this desired standby row can be calculated based on Equation 5 discussed above. Balancing the standby assignments of the standby SUs per active SU does not guarantee a perfectly balanced standby load, which is why some of the active assignments of the active SUs are split among more than one standby.

In order to minimize the number of splits, each cell of the desired standby row can be populated with the value that is closest to the one of the standby row of the same column. Next, in order to make the sum of standby assignments of each column match the desired standby assignment value calculated for this column, the table can be evaluated to identify columns with a sum of standby assignments that exceeds the desired standby value for this column, and then splitting one of its values with another column where the sum of the standby assignments is less than the desired standby value of this latter column. The splitting can, for example, be performed according to the algorithm shown in FIG. 19.

Figures 20A, 20B, 20C:
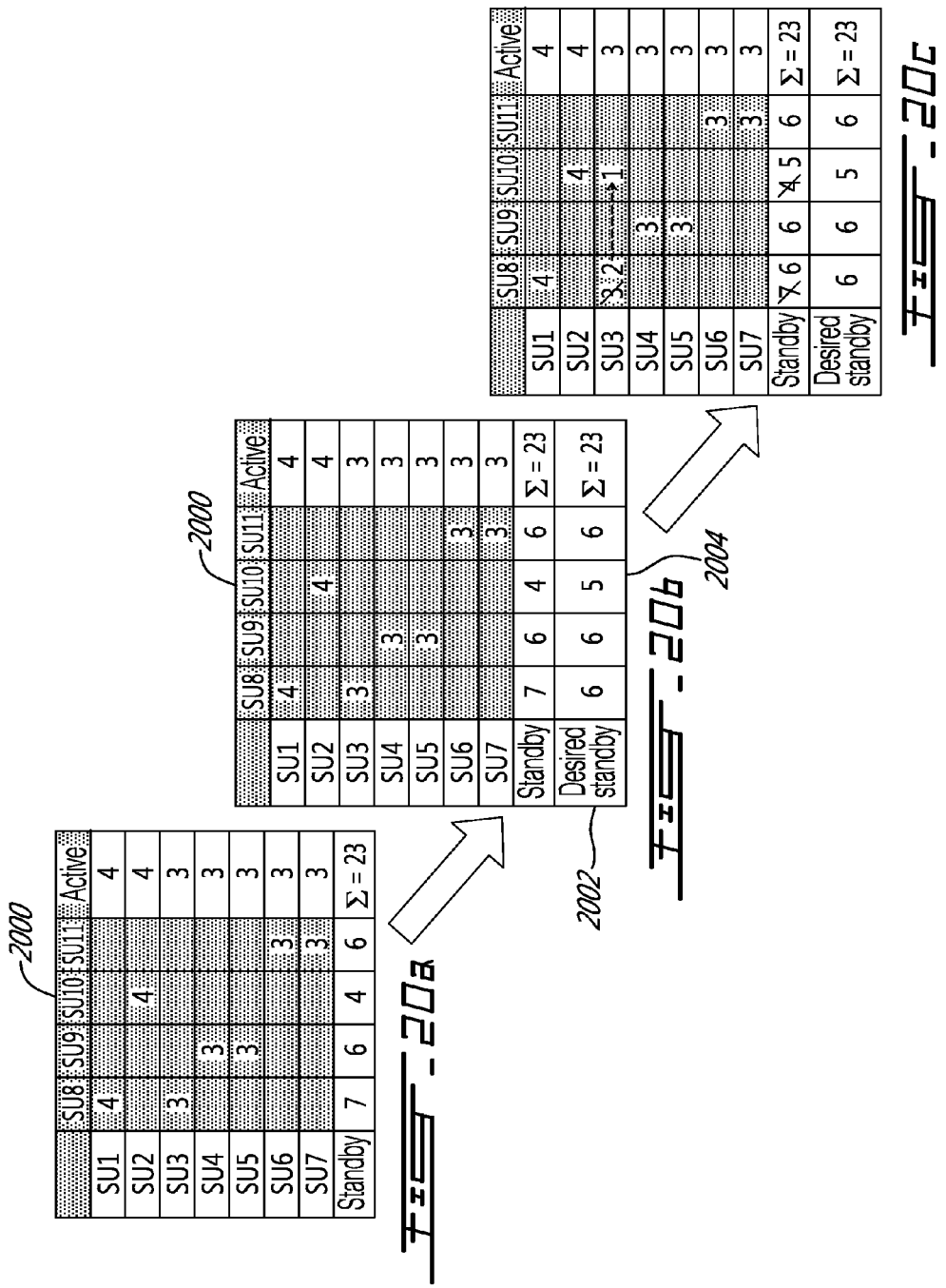
FIGS. 20(a)-20(c) depict various phases associated with generating a completely balanced standby assignment table according to an embodiment.

To illustrate an application of step 1806, consider again the exemplary system used illustratively above with an SG with N+M redundancy that has 7 active SUs and 4 standby SUs (as shown in FIG. 2), which SG is protecting 23 SIs. FIGS. 20(a)-20(c) illustrate the standby assignment table balancing steps according to this third embodiment for such an exemplary system. Therein, in FIG. 20(a), it can be seen that the first three steps 1800-1804 generate a backup standby assignment table 2000 which is the same as the table 1100 in FIG. 11, since these steps are the same as steps 800-804.

In FIG. 20(b), the new desired standby row 2002 is shown as being added to the table 2000. The values in this extra row are either the ceiling or the floor value of Equation 5 and have been added to the table based on the proximity of the values in their counterparts in the standby row of the same column. For example, the floor value of 5 was placed in the cell 2004 of the same column where the standby value is 4. The rationale behind this placement of values in the desired standby row 2002 is that it is desirable according to this embodiment to perform the least number of splitting operations as possible between SUs.

FIG. 20(*c*) illustrates how the splitting can be performed according to this embodiment. Therein, the SU with the maximum standby assignments (SU8) gave up one of these assignments to the SU with the minimum standby assignments (SU10). After each splitting the cells involved are locked so that their values are not split for a second time and hence it is guaranteed that each active SU is replaced at most by two standby SUs.

Step 1808 ensures that after a standby SU turns active or fails, its standby load is evenly re-distributed among the healthy standby SUs. Since the standby load is evenly distributed among SUs, in step 1808 the load of each standby SU is divided into equal shares, where the number of shares is equal to the number of SUs−1. Each share is then assigned to be backed up by one of the standby SUs. An exemplary way to calculate these shares is set forth below in equation 8:

$$backupStdb = \begin{Bmatrix} \left\lfloor \frac{numberofStdbAssignments}{numberOfStdbSUs - 1} \right\rfloor \\ or \\ \left\lceil \frac{numberofStdbAssignments}{numberOfStdbSUs - 1} \right\rceil \end{Bmatrix} \quad \text{the backup standby assignment per } SU \quad \text{Equation 8}$$

The number of SUs that will obtain the ceiling value of Equation 8 can be calculated in a similar way to the one presented in Equation 6. Since the standby load is not always the same for all SUs, i.e., as some SUs have one extra standby assignment, the margins of the cells in the table can be used to handle this misbalance, as described above.

Figure 21:
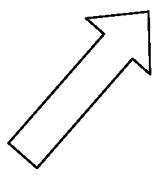
FIG. 21 illustrates a backup standby assignment table for one standby failure according to an embodiment.
Figure 22:
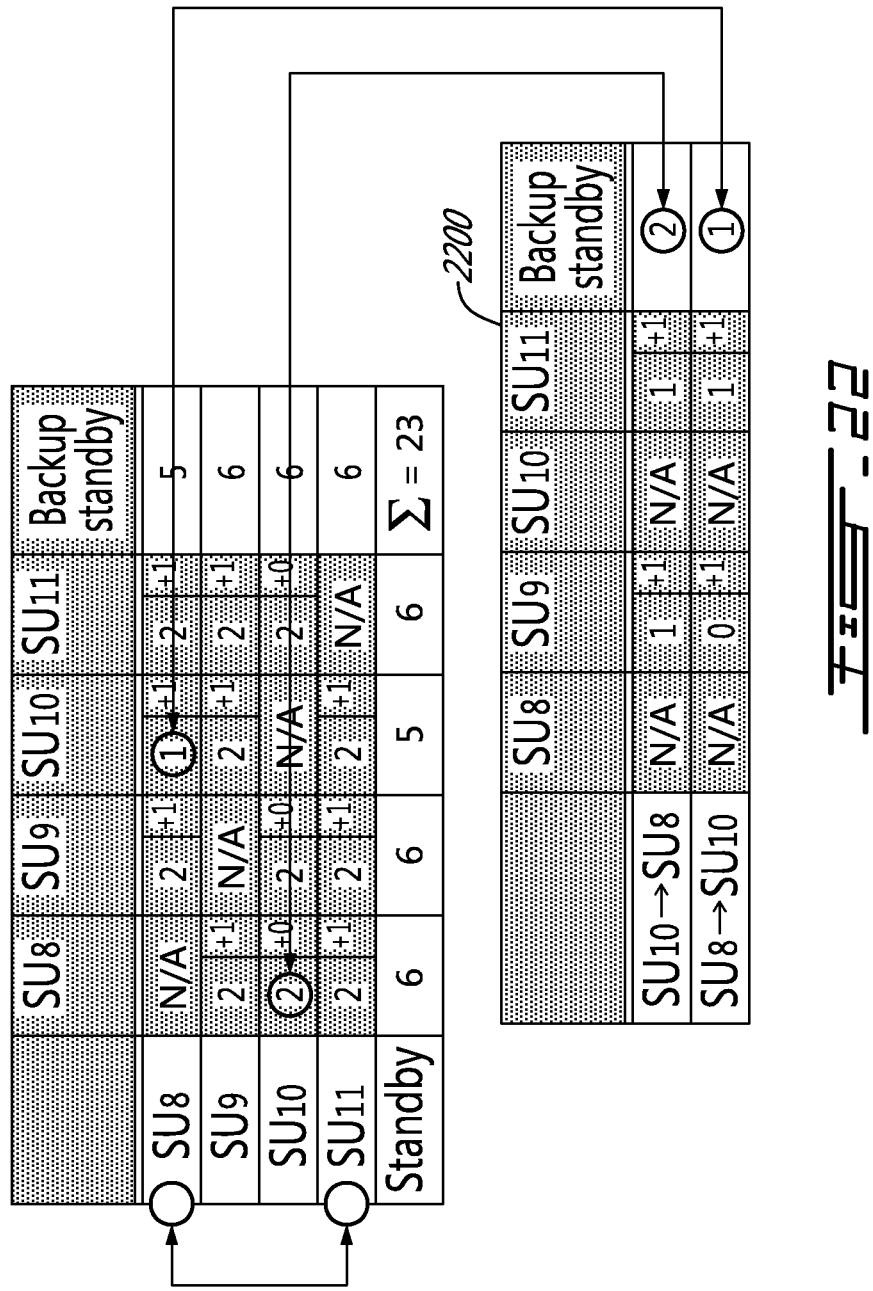
FIG. 22 shows a level-two backup standby assignment table according to an embodiment.

Thus far, the discussion has covered the equal load distribution in case of one standby SU failure. However using the 'complete balance before failure' approach, it is possible that two standbys turn active because of one active SU failure. For example, looking at the 'completely balanced standby assignment' table in FIG. 20(*c*), it can be seen that if SU3 fails, it is replaced by SU8 and SU10. Therefore another level of backup standby balancing is needed, specifically a level that considers two simultaneous standby SUs failures. Thus, according to an embodiment, a 'level-two backup standby assignment' table can be introduced. This table is only used for the standby SUs that have the implicit relation of both having standby assignments of SIs that are assigned active to the same SU. Therefore if this common active SU fails, they will both turn active but, for example as illustrated in FIG. 21, note that in the backup standby assignment table 2100 SU10 is backing up 2 standby assignments for SU8 and vice versa SU8 is backing up one standby assignment for SU10. The problem arises when these two SUs turn active simultaneously. The setback is that both SUs are not valid for backup, and therefore if this scenario occurs, the other SUs must assume the responsibility of backing up the standby assignments evenly as the level-two backup standby assignment table 2200 in FIG. 22 illustrates.

In applying step 1808 to the exemplary system which has been discussed throughout this specification, the only impact of the level 2 backup is the case of SU8 and SU10, where the 2 standby assignments of SU8 that are backed up by SU10 must also be backed by the other SUs in case SU10 is not available for backup. The same impact applies to the single standby assignment of SU10 that is backed up by SU8. In the bottom table of FIG. 22 it can be seen how SU8 and SU10 are not allowed to have the level 2 backup because they will both be unavailable when SU3 fails.

Figure 23:
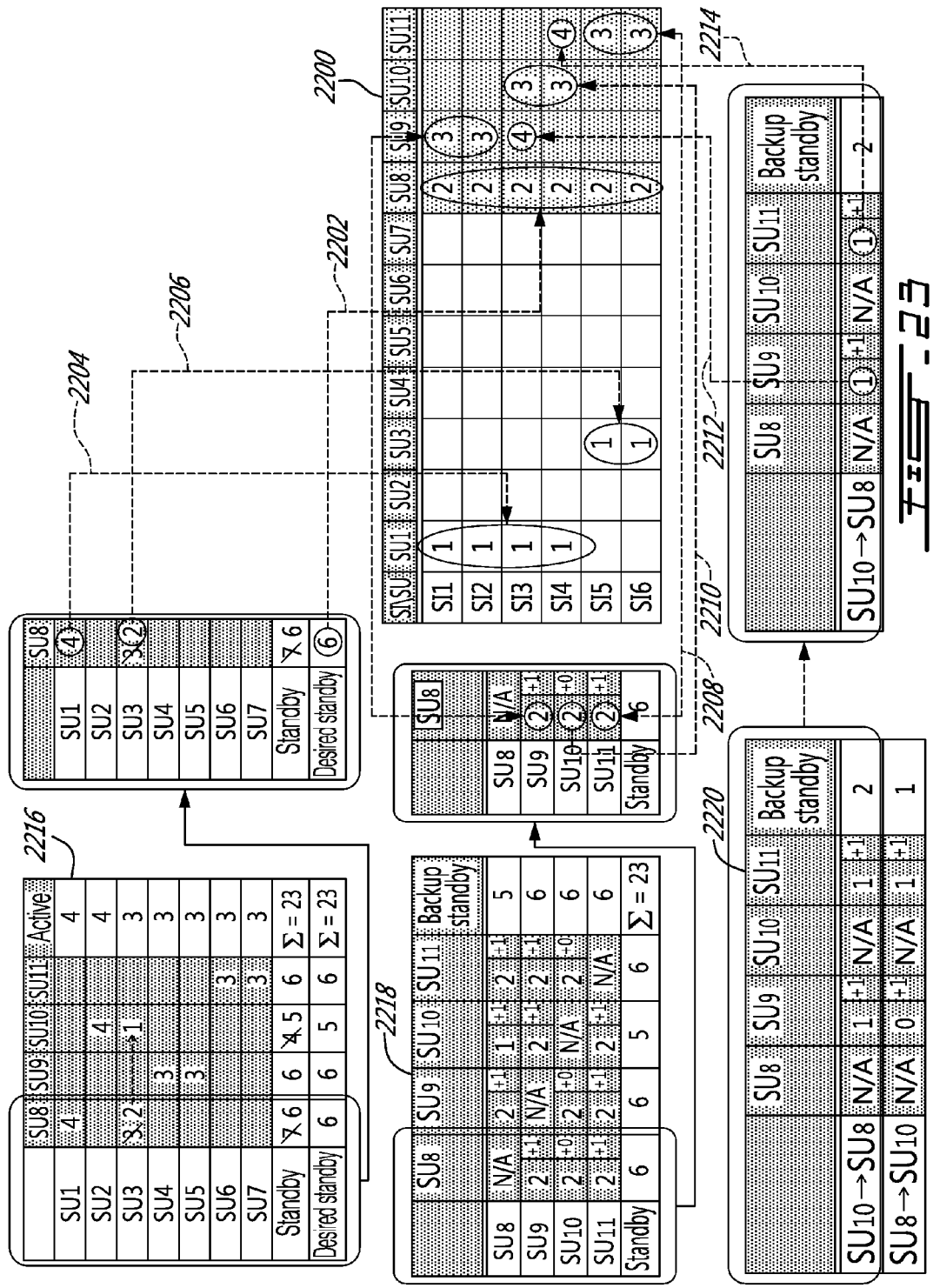
FIG. 23 depicts deriving the ranked list for the complete balance before failure approach according to an embodiment.

The last step 1810 illustrated in FIG. 18 is to derive the ranked list of SUs based on the above analysis. After completing the steps 1800-1808, deriving the ranked list for this embodiment can be performed as follows and as illustrated in FIG. 23. Based on the balanced standby assignment table, each standby $SU_j$ is given a rank of '2' for the number of SIs it is standby for. For example, SU8 is given a rank value of 2 for six of the SIs in ranked SU list 2200 as shown by dotted line 2202.

For each SU that is supposed to be active for these SIs a rank of '1' is given. This is exemplified by dotted lines 2204 and 2206 and the corresponding '1' values in the cells of ranked list 2200.

Based on the balanced backup-standby assignment table, each SU that is supposed to back up the standby assignments of $SU_j$ is given a rank of '3' in the table 2200 for the number of backups it is supposed to handle. An example of this is shown for SU8 via dotted lines 2208 and 2210. Based on the level-two backup standby assignment table, each $2^{nd}$ level standby SU is given a rank of 4, as exemplified in FIG. 23 by dotted lines 2212 and 2214 and the corresponding cells in table 2200.

Figure 24:
FIG. 24 shows a ranked service unit list according to another embodiment.

Thus, FIG. 23 illustrates how all three of the tables described above, i.e., active standby assignment table 2216, backup standby assignment table 2218 and the level two backup standby table 2220, can be used to generate a ranked SU list 2200 which can, in turn be used by an AMF configuration generator to balance loading in a system. The ranking of '4' will only be used in this purely illustrative example when SU3 fails and both SU8 and SU10 become active. Then the other SUs must handle their standby load; including the load that these 2 SUs were supposed to get from each other. For example, it can bee seen in FIG. 16 that the 2 SIs originally assigned to SU8 and backed up by SU10 (i.e. SU10 has a rank of '3' for them) have been backed up by SU9 and SU10 by giving them a rank of '4', which is the next higher rank in case SU8 and SU10 become active. A complete ranked list 2400 of SUs associated with this example is provided in FIG. 24.

There are certain ideal cases where the load can be completely balanced before failure regardless of which of the above-described embodiments are used for load balancing. These are the case were the combination of the number of active SUs (N), number of standby SUs (M) and number of SIs fit together perfectly. An example of such an ideal case is when N % M=0. This means that each standby SU will be a standby for (N÷M) SUs. In such a case, after an active SU fails, one standby will take its active load, and thus the active load will remain perfectly balanced without the minor±1 difference in the active assignment. The only difference between the approaches would be what happens to the standby load after failure, i.e., the approaches in the first and third embodiments describe above will behave the same, while the approach in the second embodiment will re-assign the standby load to exactly one standby SU.

Presented above are three different embodiments for load balancing in systems employing an N+M redundancy model. Each embodiment has its advantages and shortcomings as the table provided as FIG. 25 illustrates. It should be noted that in the 'one active for one standby' approach although the standby load of a standby SU that turned active of failed is evenly re-distributed among the standby SUs, it does not guarantee that the standby load became balanced, especially if before failure we had a significant misbalance. Another issue to point out is that if the autoadjust feature of the SG is turned off, that is, after a failure, when the failed SU is repaired, the SG does not re-adjust to its original configuration, the 'complete balance before failure' approach performs poorly after failure, because there will have two active SUs with less active load than the others and with each additional failure the situation gets worst. In this situation the other two approaches perform very well when a single failure occurs. Thus the selection of, for example, one of these three embodiments to perform load balancing for a particular system implementation will likely vary from system to system.

Figure 26:
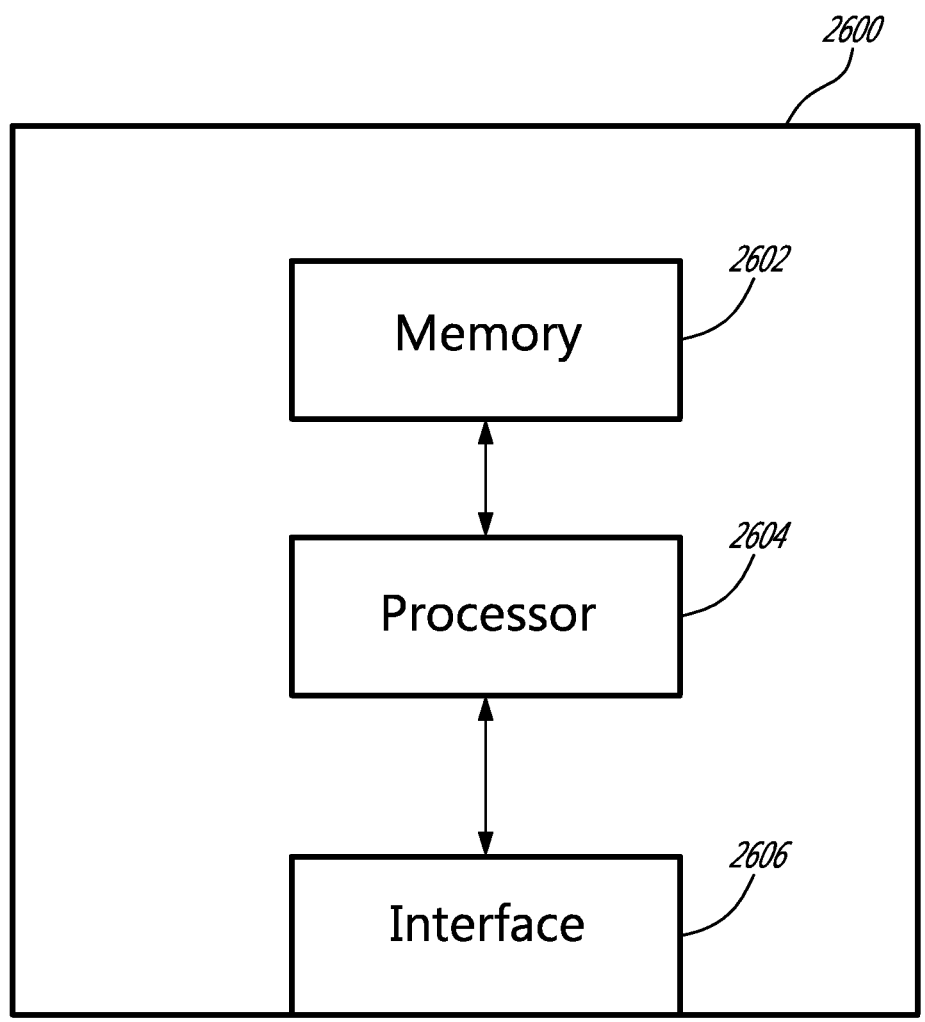
FIG. 26 depicts a node which can be used to generate AMF configurations according to an embodiment.

The techniques described above can be performed by an AMF configuration generator 306 at configuration time, e.g., when an AMF specified system is configured for service. The AMF (or other) configuration generator can implement some, or all, of the afore-described algorithms and techniques to balance the backup roles and active assignments of SUs. The configuration generator may be implemented as software running on a computer or server 2600 as shown in FIG. 26. Therein, processor 2602 can execute software code which includes the afore-described techniques and algorithms, that can be stored in memory 2604. The inputs described above, e.g., from software vendors, etc., can be provided to the processor 2602 via interface 2606.

While the steps illustrated in FIGS. 8 and 18 depict methods for balancing assignments and loads according to embodiments, other embodiments can operate more generally. For example, as shown in the flow chart of FIG. 27, another method for balancing load includes calculating an active workload that the N active service units need to handle at step 2700. Each of the N active service units in the group are provided with an active workload assignment based on the calculated active workload at step 2702. The standby assignments are distributed among the M standby service units substantially equally at step 2704. The output of the distributing step 2704, which is not part of the method of FIG. 27, may, for example, be a ranked list of SUs or may take some other form which can be used by an AMF (or other) system at runtime to make balanced assignments of both active loads and standby roles.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method for balancing standby workload assignments and active workload assignments for a group of service units in a system which employs an N+M redundancy model to provide protection for a workload represented by a plurality of service instances, wherein N service units are active service units and M service units are standby service units, N and M being positive integers, the method comprising:

calculating a first set of numbers representing the numbers of service instances to be assigned to corresponding ones of N active service units, such that differences among the first set of numbers are minimized;

providing each of the N active service units in the group with an active workload assignment based on the calculated first set of numbers, wherein the active workload assignment specifies the number of service instances assigned to each of the N active service units;

calculating a second set of numbers representing the numbers of service instances to be assigned to corresponding ones of the M standby service units, such that differences among the second set of numbers are minimized; and distributing standby workload assignments among the M standby service units based on the calculated second set of numbers, wherein the standby workload assignments specify the number of service instances assigned to each of the M standby service units.

2. The method of claim 1, wherein the step of distributing standby workload assignments further comprises:

distributing the standby workload assignments without splitting the active workload assignment of any of the N active service units among multiple ones of the M standby service units.

3. The method of claim 1, wherein the workload in said system is substantially balanced between said service units both while all of said service units are operational and after a failure of one of said service units.

4. The method of claim 1, wherein each of said standby workload assignments indicate which service unit will support a service instance that is initially assigned to another service unit as one of said active workload assignments, if said another service unit fails.

5. The method of claim 1, further comprising:

deriving a ranked list of service units for said active workload assignments and said standby workload assignments.

6. The method of claim 1, wherein the service units are for Service Instances (SI) in an Availability Management Framework (AMF).

7. The method of claim 1, wherein the step of distributing the standby workload assignments among the M standby service units further comprises:

populating a backup standby assignment table by filling a standby row with identical values of the standby row in a balanced standby assignment table, filling margins of each row of associated with a service unit in the backup standby assignment table with a value of (standby load of SUi-minimum standby load among the standby SUs) and, for each column in the backup standby assignment table, calculating a sum of all the column margins plus the value in the standby cell in said column to generate a temporary sum and distributing the temporary sum equally among cells in said column.

8. The method of claim 7, wherein the sum is calculated as:

$$tempCellValue = \left\{ \begin{array}{c} \left\lfloor \frac{tempSum}{numberOfStdbSUs - 1} \right\rfloor \\ \text{or} \\ \left\lceil \frac{tempSum}{numberOfStdbSUs - 1} \right\rceil \end{array} \right\}.$$

9. The method of claim 8, wherein the load of one standby service unit is distributed among several standby service units when the one standby service unit fails or becomes active and further comprising the step of:

subtracting, from each cell value, the value in the cell's margin.

10. The method of claim 1, wherein the step of distributing the standby workload assignments among the M standby service units further comprises:

using a constraint that each of the M standby service units will be backed up by only one of the other M standby service units.

11. The method of claim 10, wherein when a standby SU turns active or fails all of its standby load is assigned to the standby service unit with a lowest standby load.

12. The method of claim 1, further comprising the step of: completely balancing, within plus or minus one service instance, the standby workload assignments of the standby service units.

13. A configuration generator comprising:
a processor configured to balance standby workload assignments and active workload assignments for a group of service units in a system which employs an N+M redundancy model to provide protection for a workload represented by a plurality of service instances, wherein N service units are active service units and M service units are standby service units, N and M being positive integers, the processor configured to:
calculate a first set of numbers representing the numbers of service instances to be assigned to corresponding ones of the N active service units, such that differences among the first set of numbers are minimized,
provide each of the N active service units in the group with an active workload assignment based on the calculated first set of numbers, wherein the active workload assignment specifies the number of service instances assigned to each of the N active service units,
calculate a second set of numbers representing the numbers of service instances to be assigned to corresponding ones of the M standby service units, such that differences among the second set of numbers are minimized, and
distribute standby workload assignments among the M standby service units based on the calculated second set of numbers, wherein the standby workload assignments specify the number of service instances assigned to each of the M standby service units.

14. The configuration generator of claim 13, wherein said processor is further configured to distribute the standby workload assignments without splitting the active workload assignment of any of the N active service units among multiple ones of the M standby service units.

15. The configuration generator of claim 13, wherein the workload in said system is substantially balanced between said service units both while all of said service units are operational and after a failure of one of said service units.

16. The configuration generator of claim 13, wherein each of said standby workload assignments indicate which service unit will support a service instance that is initially assigned to another service unit as one of said active workload assignments, if said another service unit fails.

17. The configuration generator of claim 13 wherein said processor is further configured to derive a ranked list of service units for said active workload assignments and said standby workload assignments.

18. The configuration generator of claim 13, wherein the service units are for Service Instances (SI) in an Availability Management Framework (AMF).

19. The configuration generator of claim 13, wherein the processor is further configured to balance the standby workload assignments among the M standby service units by populating a backup standby assignment table by filling a standby row with identical values of the standby row in a balanced standby assignment table, filling margins of each row of associated with a service unit in the backup standby assignment table with a value of (standby load of SUi-minimum standby load among the standby SUs) and, for each column in the backup standby assignment table, calculating a sum of all the column margins plus the value in the standby cell in said column to generate a temporary sum and distributing the temporary sum equally among cells in said column.

20. The configuration generator of claim 19, wherein the sum is calculated as:

$$tempCellValue = \left\{ \begin{array}{c} \left\lfloor \frac{tempSum}{numberOfStdbSUs-1} \right\rfloor \\ \text{or} \\ \left\lceil \frac{tempSum}{numberOfStdbSUs-1} \right\rceil \end{array} \right\}.$$

21. The configuration generator of claim 20, wherein the load of one standby service unit is distributed among several standby service units when the one standby service unit fails or becomes active and wherein said processor is further configured to subtract, from each cell value, the value in the cell's margin.

22. The configuration generator of claim 13, wherein the processor balances the standby workload assignments among the M standby service units using a constraint that each of the M standby service units will be backed up by only one of the other M standby service units.

23. The configuration generator of claim 22, wherein when a standby SU turns active or fails all of its standby load is assigned to the standby service unit with a lowest standby load.

24. The configuration generator of claim 13, wherein processor is further configured to completely balance, within plus or minus one service instance, the standby workload assignments of the standby service units.

* * * * *

UNITED STATES PATENT AND TRADEMARK OFFICE
CERTIFICATE OF CORRECTION

PATENT NO. : 8,549,533 B2
APPLICATION NO. : 13/051824
DATED : October 1, 2013
INVENTOR(S) : Kanso et al.

It is certified that error appears in the above-identified patent and that said Letters Patent is hereby corrected as shown below:

On the Title Page, in Item (56), under "OTHER PUBLICATIONS", in Column 2, Line 4, delete "arbitray" and insert -- arbitrary --, therefor.

In the Drawings

Fig. 10, Drawing Sheet 9 of 27, Line 11, delete "While (not isBalanced(1)" and insert -- While (not isBalanced(1)) --, therefor.

Fig. 10, Drawing Sheet 9 of 27, Line 16, delete "(Active)" and insert -- (Active)) --, therefor.

Fig. 26, Drawing Sheet 26 of 27, delete " " and insert -- --, therefor.

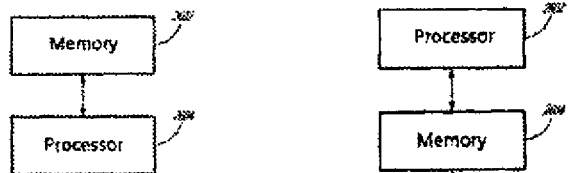

In the Specification

Column 5, Line 42, delete "SU1-5U7," and insert -- SU1-SU7, --, therefor.

Column 9, Line 32, delete "numOJSIs" and insert -- numOfSIs --, therefor.

Column 15, Line 18, delete "SU," and insert -- $SU_x$ --, therefor.

Column 15, Line 20, delete "SU," and insert -- $SU_x$ --, therefor.

Column 19, Line 18, delete "SU," and insert -- $SU_i$ --, therefor.

Signed and Sealed this
Tenth Day of June, 2014

Michelle K. Lee
*Deputy Director of the United States Patent and Trademark Office*

CERTIFICATE OF CORRECTION (continued)
U.S. Pat. No. 8,549,533 B2

Column 20, Line 13, delete "columns 'cells" and insert -- column's cells --, therefor.

Column 24, Line 40, delete "bee" and insert -- be --, therefor.

In the Claims

Column 25, Line 63, in Claim 1, delete "of" and insert -- of the --, therefor.